(12) United States Patent
Aurbach et al.

(10) Patent No.: US 9,012,072 B2
(45) Date of Patent: Apr. 21, 2015

(54) RECHARGEABLE MAGNESIUM BATTERY

(75) Inventors: Doron Aurbach, Bney Brak (IL); Elena Levi, Givat Shmuel (IL); Ariel Mitelman, Elad (IL); Eli Lancry, Modiin (IL); Oren Mizrahi, Tel Aviv (IL); Yosef Gofer, Zur Igal (IL); Orit Chasid, Zur Igal (IL); Gurukar Shivappa Suresh, Bangalore (IN)

(73) Assignee: Bar-Ilan University, Ramat Gan (IL)

( * ) Notice: Subject to any disclaimer, the term of this patent is extended or adjusted under 35 U.S.C. 154(b) by 1979 days.

(21) Appl. No.: 11/899,319

(22) Filed: Sep. 5, 2007

(65) Prior Publication Data

US 2008/0182176 A1    Jul. 31, 2008

Related U.S. Application Data

(60) Provisional application No. 60/897,255, filed on Jan. 25, 2007, provisional application No. 60/897,254, filed on Jan. 25, 2007.

(51) Int. Cl.

| H01M 10/0567 | (2010.01) |
|---|---|
| C01B 19/00 | (2006.01) |
| B82Y 30/00 | (2011.01) |
| C01B 17/20 | (2006.01) |
| C01G 39/00 | (2006.01) |
| C01G 53/00 | (2006.01) |
| H01M 4/58 | (2010.01) |
| H01M 10/054 | (2010.01) |
| H01M 10/0568 | (2010.01) |

(Continued)

(52) U.S. Cl.
CPC ............ *C01B 19/002* (2013.01); *B82Y 30/00* (2013.01); *C01B 17/20* (2013.01); *C01G 39/00* (2013.01); *C01G 39/006* (2013.01); *C01G 53/006* (2013.01); *H01M 4/581* (2013.01); *H01M 4/5815* (2013.01); *H01M 10/054* (2013.01); *H01M 10/0568* (2013.01); *C01P 2002/01* (2013.01); *C01P 2002/08* (2013.01); *C01P 2002/50* (2013.01); *C01P 2002/72* (2013.01); *C01P 2002/86* (2013.01); *C01P 2004/03* (2013.01); *C01P 2004/04* (2013.01); *C01P 2004/62* (2013.01); *C01P 2004/64* (2013.01); *C01P 2006/40* (2013.01); *H01M 4/136* (2013.01); *H01M 4/466* (2013.01); *C01P 2002/88* (2013.01)

(58) Field of Classification Search
CPC ..................... H01M 10/0567; H01M 6/145
USPC ................... 429/188, 199, 201, 337, 341
See application file for complete search history.

(56) References Cited

U.S. PATENT DOCUMENTS

| 3,864,167 A | * | 2/1975 | Broadhead et al. ........... 429/338 |
| 4,104,451 A | | 8/1978 | Klemann et al. |

(Continued)

*Primary Examiner* — Tracy Dove
(74) *Attorney, Agent, or Firm* — Symbus Law Group, LLP; Clifford D. Hyra

(57) ABSTRACT

This invention generally relates to electrochemical cells utilizing magnesium anodes, new solutions and intercalation cathodes. The present invention is a new rechargeable magnesium battery based on magnesium metal as an anode material, a modified Chevrel phase as an intercalation cathode for magnesium ions and new electrolyte solution from which magnesium can be deposited reversibly, which have a very wide electrochemical window. The Chevrel phase compound is represented by the formula $Mo_6S_{8-Y}Se_Y$ in which y is higher than 0 and lower than 2 or by the formula $M_XMo_6S_8$ in which M is selected from the group comprising of copper (Cu), nickel (Ni), silver (Ag) and/or any other transition metal; further wherein x is higher than 0 and lower than 2.

15 Claims, 18 Drawing Sheets

(51) Int. Cl.
*H01M 4/136* (2010.01)
*H01M 4/46* (2006.01)

(56) References Cited

U.S. PATENT DOCUMENTS

| | | |
|---|---|---|
| 4,139,681 A | 2/1979 | Klemann et al. |
| 4,511,642 A | 4/1985 | Higashi et al. |
| 4,542,081 A | 9/1985 | Armand et al. |
| 4,894,302 A | 1/1990 | Hoffman et al. |
| 5,491,039 A | 2/1996 | Shackle |
| 5,597,663 A * | 1/1997 | Pendalwar et al. ............ 428/188 |
| 6,316,141 B1 * | 11/2001 | Aurbach et al. ............... 429/199 |
| 6,713,212 B2 * | 3/2004 | Aurbach et al. ............... 429/188 |

* cited by examiner

| Solution | Concentration | Over potential for magnesium deposition (mV) | Reversibility of Magnesium deposition |
|---|---|---|---|
| 1:2 MgBu2-AlCl2Et/THF | M0.25 | 552 | 100% stable. |
| 2:1 PhMgCl-AlCl3/THF | M0.1 | 270 | <80% |
| 2:1 PhMgCl-AlCl3/THF | M0.25 | 215 | <95% |
| 2:1 PhMgCl-AlCl3/THF | M0.4 | 195 | 100% stable. |
| 2:1 PhMgCl-AlCl3/THF | M0.6 | 195 | 98% stable. |
| 4:1 PhMgCl-AlCl3/THF | M0.1 | 195 | <90% |
| 2:1 PhMgCl-AlCl3/THF | M0.2 | 250 | <65% |
| 4:3 PhMgCl-AlCl3/THF | M0.3 | 295 | 95% stable. |
| 1:1 PhMgCl-AlCl3/THF | M0.4 | 320 | <85% |
| 3:2 PhMgCl-AlCl3/THF | M0.4 | 305 | <80% |

FIG. 19

| Species | Peaks shift (ppm) | Peaks width (Hz) |
|---|---|---|
| $AlPh_4^{(-)}$ | 132 | 25 |
| $Ph_3AlCl^{(-)}$ / $AlPh_3$ | 115 | 125 |
| $Ph_2AlCl_2^{(-)}$ / $Ph_2AlCl$ | 112 | 2000 |
| $PhAlCl_3^{(-)}$ / $PhAlCl_2$ | 91 | 1460 |
| $Al_2Cl_6$ | 102 | 500 |
| $AlCl_3$ | 62 | 1500 |

FIG. 20

RECHARGEABLE MAGNESIUM BATTERY

CROSS REFERENCE TO RELATED APPLICATIONS

This application claims the benefit of U.S. Provisional Application No. 60/897,255 filed Jan. 25, 2007 and U.S. Provisional Application No. 60/897,254 filed Jan. 25, 2007.

FIELD OF THE INVENTION

This invention generally relates to field of rechargeable magnesium batteries.

BACKGROUND

This invention generally relates to electrochemical cells utilizing an intercalation cathode. More particularly, this invention relates to electrochemical cells utilizing an intercalation cathode, a non-aqueous gel polymer electrolytic system and a magnesium anode.

Since the 1980s there have been attempts to develop rechargeable magnesium batteries. These batteries may be regarded as an analog of the well-known Li battery, because both of the batteries are based on the same intercalation phenomenon: $Li^+$ and $Mg^{2+}$ ions from the electrolyte solution are inserted into the host cathode material upon discharge of the battery and return to the solution (and to the anode) upon the charge of the battery. Rechargeable, high energy density electrochemical cells of various kinds are known. Such cells usually consist of a transition metal oxide or chalcogenide cathode-active material, an anode-active alkali metal or alkali metal intercalation compound, and an electrolyte solution containing a dissolved alkali-based salt in an aprotic organic or inorganic solvent, or polymer electrolyte.

Theoretically, a rechargeable cell is capable of charging and discharging indefinitely, however, in practice such performance is unattainable. The degradation mechanisms of the various anodes, cathodes and electrolytes are complex and are known to those skilled in the art.

Two basic types of cathodes are appropriate for a battery system that is rechargeable at ambient temperatures. A liquid cathode can be used, allowing reactions to take place with facility. Liquid cathodes are also advantageous in that thin films or crusts forming on the surface of the cathode tend to crack, such that the cathode activity remains high over the course of the cycling. The mobility of the cathodic material is a liability, however, in that contact with the anode short-circuits the cell. Thus, an electrochemical cell with a liquid cathode requires protective, insulating films on the anode.

A solid cathode must be insoluble in the electrolyte, and must be able to absorb and desorb a charge-compensating ion in a substantially reversible and fast manner. A prime example of a solid cathode of this variety is an intercalation cathode. Intercalation chemistry focuses on the insertion of ions or neutral molecules into an inorganic or organic matrix. In a typical intercalation cathode, cations dissolved in the electrolyte solution are inserted into the inorganic matrix structure.

In contrast to Li, Mg batteries should be relatively safe, cheap and green (without dangerous toxic materials). However, no material was found suitable for the Mg insertion. In spite of the evident similarity between Li and Mg intercalation, almost all inorganic compounds, which prove themselves in Li batteries, are not active or show extremely slow kinetics in the case of Mg. U.S. Pat. No. 6,316,141 teaches that only a group of intercalation materials of particular importance is called Chevrel-phase materials, also known as Chevrel compounds, allows a relatively fast insertion of $Mg^{2+}$ ions owing to their unusual crystal structure. Chevrel compounds contain an invariant portion consisting of molybdenum and a chalcogen—sulfur, selenium, tellurium, or mixtures thereof. The invariant portion is generally of the formula $Mo_6T_n$, where T represents the chalcogen and n is usually about 8. The unique crystal structure of Chevrel-phase materials allows the insertion of one or more metal ions in a reversible, partially reversible, or irreversible manner. The stoichiometry of the intercalation compound can be represented as $M_xMo_6T_n$, where M represents the intercalated metal, x may vary from 0 (no intercalated metal) to 4 or less, depending on the properties of the particular anion T (T is S, Se, Te).

The intercalation of metal ions into the Chevrel compound releases energy. Since the process is partially or fully reversible, these compounds are particularly suitable as electrodes in electrochemical cells. For example, lithium, the predominant intercalation ion, can be removed from the Chevrel compound by the application of electrical energy. The energy is released as electrical energy upon reintercalation.

The following two compositions are the most attractive as a cathode: $Mg_xMo_6S_8$ and a metal-free sulfide, $Mo_6S_8$, with a maximal theoretical capacity of 122 mA*h/g (the smallest molecular weight). However $Mg_xMo_6S_8$ obtained by direct high-temperature synthesis, is electrochemically inactive due to the insulating MgO film formed on the surface of the active material. While $Mo_6S_8$ shows a good electrochemical performance, an essential part (about 30%) of the initial capacity is lost in the first cycle. This loss results from the Mg trapping in $Mg_xMo_6S_8$ when X<1. Different ways to avoid the trapping and to improve the electrodes' kinetics were suggested such as an additional potentiostatic stage at high voltage upon battery charge and milling of the active mass. However, all these operations complicate the battery preparation and exploitation, and only solve the problem partially: 90-100 mA*h/g (75-80% of the theoretical capacity) can be obtained at 4.5 h of the battery discharge, but this value decreases essentially for higher current density because the trapping is associated with the relatively low kinetics of Mg insertion into $Mg_xMo_6S_8$, when X<1 (relatively low rate capability).

Thus, there is still a long felt need for ways to avoid the trapping of the $Mg^{2+}$ ions, which caused by their motion in a circuitous manner within definite groups of the cation sites, instead of the progressive diffusion between different types of sites needed for the normal function of the electrode material.

Furthermore, the cathode-active material in the high energy density, rechargeable electrochemical cells must be paired with a suitable anode-active material, which is most commonly made of an active metal such as alkali metals. However, the performance of a particular anode-cathode couple is strongly influenced by the nature of the electrolyte system. Certain non-aqueous electrolytes are known to perform well with a particular anode-cathode couple and be ineffective or significantly less effective with other anode-cathode couples, either because the electrolyte solution's components are not stable or because the solutions components degrades during cycling active electrodes. As a result, much of the prior art relates to the cathode-active material, the anode-active material and the electrolyte not only as independent entities, but also as units within an appropriate battery system.

U.S. Pat. No. 4,104,451 to Klemann et al., discloses reversible batteries with an alkali metal anode, a chalcogenide cathode, and organometallic alkali metal salts in organic solvents as the electrolyte system. Non-aqueous electrolyte systems containing alkali metal salts of boron or aluminum anions based which also contain organic groups are disclosed.

Organoborate salts of alkali metals represented by the formula

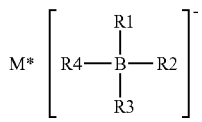

are disclosed in U.S. Pat. No. 4,511,642 to Higashi et al., wherein R1-R4 are organic radicals selected from the following groups: alkyl, aryl, alkenyl, cycloalkyl, allyl, heterocyclic, and cyano, and M.sup.+ represents an alkali metal ion.

U.S. Pat. No. 4,139,681 describes cells containing electrolytically active metal salt complexes having the formula $ZMR_n X_i$, wherein Z is a metal from a group containing aluminum, the Rs are specified haloorganic radicals, the Xs are selected from various halides, alkyls, aryls, alkaryls and aralkyls. M is specified to be an alkali metal, with lithium being the preferred embodiment.

U.S. Pat. No. 4,542,081 to Armand et al., describes solutions for the constitution of solid electrolyte materials of electrochemical generators. The compound is of the formula $$(R-C\equiv C)_4 Z^-, M^+$$

in which Z is a trivalent element capable of entering into 4-coordination, such as aluminum, and R represents groups which are non-proton donors. M is specified to be an alkali metal.

The prior art described above, including U.S. Pat. Nos. 4,104,451, 4,511,642, 4,139,681 and 4,542,081, specifies that M is an alkali metal. The use of an alkaline earth metal anode such as magnesium would appear disadvantageous relative to the use of an alkali metal such as lithium because alkali metal anodes are much more readily ionized than are alkaline earth metal anodes. In addition, on recharge the cell must be capable of re-depositing the anode metal that was dissolved during discharge, in a relatively pure state, and without the formation of deposits on the electrodes.

However, there are numerous disadvantages to alkali batteries. Alkali metals, and lithium in particular, are expensive. Alkali metals are highly reactive. Alkali metals are also highly flammable, and fire due to reaction of alkali metal with oxygen or other active material is extremely difficult to extinguish. Lithium is poisonous and compounds thereof are known for their severe physiological effects, even in minute quantities. As a result, the use of alkali metals requires specialized facilities, such as dry rooms, specialized equipment and specialized procedures.

In contradistinction, magnesium metal and aluminum metal are easy to process. The metals are reactive, but undergo rapid passivation of the surface, such that the metals exhibit highly stable behavior. Both magnesium and aluminum are inexpensive relative to the alkali metals.

U.S. Pat. No. 4,894,302 to Hoffman et al., discloses an electrochemical cell having an intercalation cathode, an alkaline earth anode, and a non-aqueous liquid electrolyte containing an organic solvent and an electrolytically active, organometallic alkaline earth metal salt represented by the formula

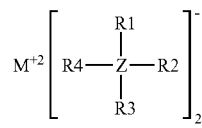

wherein Z is boron or aluminum; R1-R4 are radicals selected from the following groups: alkyl, aryl, alkaryl, aralkyl, alkenyl, cycloalkyl, allyl, heterocyclic alkyl, and cyano; and M represents an alkaline earth metal such as magnesium. The radicals can be inertly substituted with substituents that have no detrimental effect upon the electrolytic properties of the electrolyte composition with respect to effectiveness in an electrochemical cell, such as halogenated or partially halogenated derivatives of the above groups. While exhaustive care is taken to disclose a broad range of organic radicals and halogenated organic radicals, bonding the metallic species of the anion (Z) to another inorganic species is not considered.

U.S. Pat. No. 5,491,039 describes a solid, single-phase electrolyte containing a solid polymeric matrix and an organometallic ion salt represented by the formula $$M_C(ZR_n)$$

wherein Z is boron, aluminum or titanium; $R_n$ are various substituted or unsubstituted organic radicals; M is lithium, sodium, potassium, or magnesium, c is 1 or 2, and n is an integer from 1 to 6. As in U.S. Pat. No. 4,894,302, a broad range of organic radicals including halogenated organic radicals is disclosed, but the bonding of the metallic species of the anion (Z) to another inorganic species is not reported. In all cases, metallic species Z is bonded to a carbon atom. More specifically, the bonding of the metallic species of the anion (Z) directly to a halogen is not disclosed. It must be emphasized that this is of particular significance in light of the fact that U.S. Pat. No. 5,491,039 teaches an extremely broad range of radicals that may be appropriate for attaching to the metallic species of the anion.

Both U.S. Pat. No. 5,491,039 and U.S. Pat. No. 4,894,302 disclose electrochemical cells having an alkaline earth anode such as magnesium. For commercial application, however, such magnesium batteries must be essentially rechargeable and must have a reasonable shelf life. Sustaining a voltage of 1.5 volts is problematic or impossible with the usual intercalation cathodes and electrolytes according to prior art. Magnesium batteries operating at 1.5 volts are particularly prone to electrolyte decomposition and to encrustation/passivation of both electrode surfaces.

Thus, there is a long felt need for a rechargeable magnesium battery, which would be more safe, clean, efficient and economical than rechargeable batteries known heretofore.

SUMMARY OF THE INVENTION

It is one object of the invention to disclose an intercalation cathode for an electrochemical cell, especially useful for magnesium rechargeable batteries, comprising a Chevrel phase compound; wherein said Chevrel phase compound represented by the formula $Mo_6S_{8-Y}Se_Y$ in which y is higher than 0 and lower than 2.

It is another object of the invention to disclose an intercalation cathode for an electrochemical cell as defined above, wherein said Chevrel phase compound represented by the formula $M_X Mo_6 S_8$ in which M is selected from the group comprising of copper (Cu), nickel (Ni), silver (Ag) and/or any other transition metal; further wherein x is higher than 0 and lower than 2.

It is another object of the invention to disclose a magnesium rechargeable battery comprising: (a) at least one intercalation cathode comprising a Chevrel phase compound; (b) at least one magnesium anode; and (c) at least one non-water gel electrolyte; wherein said Chevrel phase compound represented by the formula $Mo_6S_{8-Y}Se_Y$ in which y is higher than 0 and lower than 2.

It is another object of the invention to disclose the magnesium rechargeable battery as defined above, wherein said Chevrel phase compound represented by the formula $M_XMo_6S_8$ in which M is selected from the group comprising of copper (Cu), nickel (Ni), silver (Ag) and/or any other transition metal; further wherein x is higher than 0 and lower than 2.

It is another object of the invention to disclose the magnesium rechargeable battery as defined above, comprising said electrolyte represented by the formula $(MgR_2)_x\text{-}(AlCl_{3-n}R_n)_y$ in which R is selected from a group comprising methyl, ethyl, butyl, phenyl and their derivatives; n is higher than 0 and lower than 3; x= is higher than 1 and lower than 3; y is higher than 1 and lower than 5.

It is another object of the invention to disclose the magnesium rechargeable battery as defined above, comprising said electrolyte which is selected from a group comprising polyethylene-oxide or polyvinylidene di-fluoride (PVdF) (70-90%) tetra-glyme, tri-glyme, glyme and/or tetra-hydrofuran (THF) as plasticizer (3-10%).

It is another object of the invention to disclose the magnesium rechargeable battery as defined above, further comprising polypropylene or glass fibers separator between the electrodes.

It is another object of the invention to disclose a method for lowering the batteries self-discharge. The method comprises steps selected inter alia from: (a) providing (i) at least one intercalation cathode comprising a Chevrel phase compound; (ii) at least one magnesium anode; and (c) at least one non-water gel electrolyte; and (b) providing electrical communication between said cathode, said anode and said electrolyte; wherein said Chevrel phase compound represented by the formula $Mo_6S_{8-Y}Se_Y$ in which y is higher than 0 and lower than 2.

It is another object of the invention to disclose the method as describe above, wherein said Chevrel phase compound represented by the formula $M_XMo_6S_8$ in which M is selected from the group comprising of copper (Cu), nickel (Ni), silver (Ag) and/or any other transition metal; further wherein x is higher than 0 and lower than 2.

It is another object of the invention to disclose a method for increasing the energy density of an electrochemical cell. The method comprises steps selected inter alia from: (a) providing (i) at least one intercalation cathode comprising a Chevrel phase compound; (ii) at least one magnesium anode; and (c) at least one non-water gel electrolyte; and (b) providing electrical communication between said cathode, said anode and said electrolyte; wherein said Chevrel phase compound represented by the formula $Mo_6S_{8-Y}Se_Y$ in which y is higher than 0 and lower than 2.

It is another object of the invention to disclose the method for increasing the energy density of an electrochemical cell as describe above, wherein said Chevrel phase compound represented by the formula $M_XMo_6S_8$ in which M is selected from the group comprising of copper (Cu), nickel (Ni), silver (Ag) and/or any other transition metal; further wherein x is higher than 0 and lower than 2.

It is another object of the invention to disclose a method for increasing a cycle life of an electrochemical cell. The method comprises steps selected inter alia from: (a) providing (i) at least one intercalation cathode comprising a Chevrel phase compound; (ii) at least one magnesium anode; and (iii) at least one non-water gel electrolyte; and (b) providing electrical communication between said cathode, said anode and said electrolyte; wherein said Chevrel phase compound represented by the formula $Mo_6S_{8-Y}Se_Y$ in which y is higher than 0 and lower than 2.

It is another object of the invention to disclose the method as defined above, wherein said Chevrel phase compound represented by the formula $M_XMo_6S_8$ in which M is selected from the group comprising of copper (Cu), nickel (Ni), silver (Ag) and/or any other transition metal; further wherein x is higher than 0 and lower than 2.

It is another object of the invention to disclose a method for increasing a rate capability of an electrochemical cell. The method comprises steps selected inter alia from (a) providing (i) at least one intercalation cathode comprising a Chevrel phase compound; (ii) at least one magnesium anode; and (iii) at least one non-water gel electrolyte; and (b) providing electrical communication between said cathode, said anode and said electrolyte; wherein said Chevrel phase compound represented by the formula $Mo_6S_{8-Y}Se_Y$ in which y is higher than 0 and lower than 2.

It is yet another object of the invention to disclose the method as defined above, wherein said Chevrel phase compound represented by the formula $M_XMo_6S_8$ in which M is selected from the group comprising of copper (Cu), nickel (Ni), silver (Ag) and/or any other transition metal; further wherein x is higher than 0 and lower than 2.

It is another object of the invention to disclose a method for producing a magnesium rechargeable battery. The method comprises steps selected inter alia from (a) providing (i) at least one intercalation cathode comprising a Chevrel phase compound; (ii) at least one magnesium anode; and (iii) at least one non-water gel electrolyte; and (b) providing electrical communication between said cathode, said anode and said electrolyte; wherein said Chevrel phase compound represented by the formula $Mo_6S_{8-Y}Se_Y$ in which y is higher than 0 and lower than 2.

It is another object of the invention to disclose the method as defined above wherein said Chevrel phase compound represented by the formula $M_XMo_6S_8$ in which M is selected from the group comprising of copper (Cu), nickel (Ni), silver (Ag) and/or any other transition metal; further wherein x is higher than 0 and lower than 2.

It is another object of the invention to disclose a method for avoiding trapping of Mg-ions. The method comprises steps selected inter alia from (a) providing (i) at least one intercalation cathode comprising a Chevrel phase compound; (ii) at least one magnesium anode; and (iii) at least one non-water gel electrolyte; and (b) providing electrical communication between said cathode, said anode and said electrolyte; wherein said Chevrel phase compound represented by the formula $M_XMo_6S_8$ in which M is selected from the group comprising of copper (Cu), nickel (Ni), silver (Ag) and/or any other transition metal; further wherein x is higher than 0 and lower than 2.

It is another object of the invention to disclose the method as defined above, wherein said Chevrel phase compound represented by the formula $Mo_6S_{8-Y}Se_Y$ in which y is higher than 0 and lower than 2.

It is another object of the invention to disclose a method for increasing the rate capability of an electrochemical cell. The method comprises steps selected inter alia from (a) providing (i) at least one intercalation cathode comprising a Chevrel phase compound; (ii) at least one magnesium anode; and (iii) at least one non-water gel electrolyte; and (b) providing electrical communication between said cathode, said anode and said electrolyte; wherein said Chevrel phase compound represented by the formula $M_X Mo_6 S_8$ in which M is selected from the group comprising of copper (Cu), nickel (Ni), silver (Ag) and/or any other transition metal; further wherein x is higher than 0 and lower than 2.

It is another object of the invention to disclose the method as defined above, wherein said Chevrel phase compound represented by the formula $Mo_6 S_{8-Y} Se_Y$ in which y is higher than 0 and lower than 2.

It is another object of the invention to disclose the methods as described above, further comprising said electrolyte represented by the formula $(MgR_2)_x$-$(AlCl_{3-n}R_n)_y$, in which R is selected from a group comprising methyl, ethyl, butyl, phenyl and their derivatives; n is higher than 0 and lower than 3; x=is higher than 1 and lower than 3; y is higher than 1 and lower than 5.

It is another object of the invention to disclose the methods as described above, further comprising said electrolyte contains the polymers polyethylene-oxide or polyvinylidene difluoride (PVdF) (70-90%) tetra-glyme, tri-glyme, glyme and/or tetra-hydrofuran (THF) as plasticizer (3-10%).

It is another object of the invention to disclose the methods as described above, further comprising the step of separating the electrodes by polypropylene or glass fibers.

It is another object of the invention to disclose an electrochemical cell; said electrolyte comprising: (a) at least one magnesium-aluminum complex represented by the formula $Mg(AlR_x Cl_{4-x} X)_2$ in which R is selected from a group comprising methyl, ethyl, butyl, phenyl and their derivatives in ether solvents; x is higher than 1 and lower than 3; (b) at lest one inert salt selected from a group comprising Tetrabutylamonium-chloride, LiX in which X is selected from a group comprising chlorine (Cl) and bromine (Br); wherein said magnesium can deposit in 100% reversibly from said electrolyte solution.

It is another object of the invention to disclose a magnesium rechargeable battery comprising: (a) at least one intercalation cathode comprising a Chevrel phase compound represented by the formula $Mo_6 S_8$; (b) at least one magnesium anode; and (c) at least one electrolyte solution comprising: (a) at least one magnesium-aluminum complex represented by the formula $Mg(AlR_x Cl_{4-x})_2$ in which R is selected from a group comprising methyl, ethyl, butyl, phenyl and their derivatives in ether solvents; x is higher than 1 and lower than 3; (b) at lest one inert salt selected from a group comprising Tetrabutylamonium-chloride, LiX in which X is selected from a group comprising chlorine (Cl) and bromine (Br); wherein said magnesium anode can deposit in 100% reversibly from said electrolyte solution.

It is another object of the invention to disclose a magnesium rechargeable battery according to claim 26, wherein the concentration of said $Mg(AlR_x Cl_{4-x})_2$ is higher than 0.45M and lower than 0.55M.

It is another object of the invention to disclose a magnesium rechargeable battery according to claim 26, wherein the concentration of said LiX is higher than 0.2M and lower than 0.3M.

It is another object of the invention to disclose a method for increasing the deposition and dissolution of magnesium from electrolyte solution. The method comprises steps selected inter alia from (a) providing (i) at least one intercalation cathode comprising a Chevrel phase compound represented by the formula $Mo_6 S_8$; (ii) at least one magnesium anode; and (ii) at least one said electrolyte solution comprising: (a) at least one magnesium-aluminum complex represented by the formula $Mg(AlR_x Cl_{4-x})_2$ in which R is selected from a group comprising methyl, ethyl, butyl, phenyl and their derivatives in ether solvents; x is higher than 1 and lower than 3; in ether solvents; (b) at least one inert salt; and (c) providing electrical communication between said cathode, said anode and said electrolyte; wherein said inert salt selected from a group comprising Tetrabutylamonium-chloride, LiX in which X is selected from a group comprising chlorine (Cl) and bromine (Br).

It is another object of the invention to disclose a method increasing the conductivity of electrolyte solution. The method comprises steps selected inter alia from (a) providing (i) at least one intercalation cathode comprising a Chevrel phase compound represented by the formula $Mo_6 S_8$; (ii) at least one magnesium anode; and (ii) at least one said electrolyte solution comprising: (a) at least one magnesium-aluminum complex represented by the formula $Mg(AlR_x Cl_{4-x})_2$ in which R is selected from a group comprising methyl, ethyl, butyl, phenyl and their derivatives in ether solvents; x is higher than 1 and lower than 3; in ether solvents; (b) at lest one inert salt; and (c) providing electrical communication between said cathode, said anode and said electrolyte; wherein said inert salt selected from a group comprising Tetrabutylamonium-chloride, LiX in which X is selected from a group comprising chlorine (Cl) and bromine (Br).

It is another object of the invention to disclose the method as defined above, wherein said magnesium-aluminum complex is $(PhMgCl)_2$—$AlCl_3$ in which Ph phenyl; in THF.

It is another object of the invention to disclose the method as defined above, wherein the electrochemical window is higher than 3V; further wherein the concentration of $AlCl_3$ is 0.4M; further wherein said conductivity is 5 mS/cm at room temperature.

It is another object of the invention to disclose a method for improving the kinetics of magnesium intercalation to Chevrel phase cathode. The method comprises steps selected inter alia from (a) providing (i) at least one intercalation cathode comprising a Chevrel phase compound represented by the formula $Mo_6 S_8$; (b) at least one magnesium anode; and (c) at least one electrolyte solution comprising: (a) at least one magnesium-aluminum complex represented by the formula $Mg(AlR_x Cl_{4-x})_2$ in which R is selected from a group comprising methyl, ethyl, butyl, phenyl and their derivatives in ether solvents; x is higher than 1 and lower than 3; in ether solvents; (b) at lest one inert salt; and (d) providing electrical communication between said cathode, said anode and said electrolyte; wherein said inert salt selected from a group comprising Tetrabutylamonium-chloride, LiX in which X is selected from a group comprising chlorine (Cl) and bromine (Br).

It is another object of the invention to disclose a method for producing a Chevrel phase cathode represented by the formula of $Mo_6 S_{8-Y} Se_Y$ in which Y is higher than 0 and lower than 2. The method comprises steps selected inter alia from (a) obtaining $MoS_2$, $MoSe_2$, molybdenum and copper powder or elemental Mo, Cu, S, Se; (b) introducing said $MoS_2$, said $MoSe_2$, said molybdenum and said copper powder or said elemental Mo, Cu, S, Se into a stainless steel (SS) cell under argon atmosphere; (c) heating the mixture in said SS cell to a temperature T at a period of time t; said temperature T is lower than 900° C. and higher than 500° C.; said time t is higher than 1 hour and lower than 24 h; (d) cooling said SS cell to 25 degree C.; and (e) leaching the copper from said mixture in an aqueous HCl solution under bubbling air; wherein said chevrel phase having particle's size larger than 30 nanometer and smaller than 5 micrometer.

It is another object of the invention to disclose a method for improving the kinetics of magnesium intercalation into a Chevrel phase cathode represented by the formula of $Mo_6S_{8-Y}Se_Y$ in which Y is higher than 0 and lower than 2. The method comprises steps selected inter alia from (a) obtaining $MoS_2$, $MoSe_2$, molybdenum and copper powder or elemental Mo, Cu, S, Se; (b) introducing said $MoS_2$, $MoSe_2$, molybdenum and copper powder or elemental Mo, Cu, S, Se into a stainless steel (SS) cell under argon atmosphere; (c) heating the mixture in said SS cell to a temperature T at a period of time t; said temperature T is lower than 900° C. and higher than 500° C.; said time t is higher than 1 hour and lower than 24 h; (d) cooling said SS cell to 25 degree C.; and (e) leaching the copper from said mixture in an aqueous HCl solution under bubbling air; wherein said Chevrel phase having particle's size larger than 30 nanometer and smaller than 5 micrometer.

It is another object of the invention to disclose a method for producing a Chevrel phase cathode represented by the formula of $M_XMo_6S_8$ in which M is copper (Cu); x is higher than 0 and lower than 2. The method comprises steps selected inter alia from (a) obtaining a mixture comprising of Cu, Mo, S; (b) heating the mixture in a stainless steel (SS) cell to a temperature T at a period of time t; said temperature T is lower than 1200° C. and higher than 500° C.; said time t is higher than 1 hour and lower than 48; (c) heating the mixture in said SS cell to a temperature T1 at a period of time t1; said temperature T1 is lower than 1200° C. and higher than 500° C.; said time t1 is higher than 1 hour and lower than 48; (d) heating the mixture in said SS cell to a temperature T2 at a period of time t2; said temperature T2 is lower than 1200° C. and higher than 500° C.; said time t2 is higher than 1 hour and lower than 50; and (e) cooling said SS cell to 25 degree C. at a rate of 120° C./h; wherein said Chevrel phase having particle's size larger than 30 nanometer and smaller than 5 micrometer.

It is another object of the invention to disclose a method for improving the kinetics of magnesium intercalation into a Chevrel phase cathode represented by the formula of $M_XMo_6S_8$ in which M is copper (Cu); x is higher than 0 and lower than 2. The method comprises steps selected inter alia from (a) obtaining a mixture comprising of Cu, Mo, S; (b) heating the mixture in a stainless steel (SS) cell to a temperature T at a period of time t; said temperature T is lower than 1200° C. and higher than 500° C.; said time t is higher than 1 hour and lower than 48; (c) heating the mixture in said SS cell to a temperature T1 at a period of time t1; said temperature T1 is lower than 1200° C. and higher than 500° C.; said time t1 is higher than 1 hour and lower than 48; (d) heating the mixture in said SS cell to a temperature T2 at a period of time t2; said temperature T2 is lower than 1200° C. and higher than 500° C.; said time t2 is higher than 1 hour and lower than 50; and (e) cooling said SS cell to 25 degree C. at a rate of 120° C./h; wherein said Chevrel phase having particle's size larger than 30 nanometer and smaller than 5 micrometer.

It is another object of the invention to disclose a method for producing a Chevrel phase cathode represented by the formula of $M_XMo_6S_8$ in which M is copper (Cu); x is higher than 0 and lower than 2. The method comprises steps selected inter alia from (a) milling and squeezing a mixture comprising $MoS_2$, CuS and Mo; (b) heating said mixture in a stainless steel (SS) cell to a temperature T at a rate of about 90° C./h; said temperature T is lower than 1200° C. and higher than 500° C.; (c) heating the mixture in said SS cell to a temperature T1 at a period of time t1; said temperature T1 is lower than 1200° C. and higher than 500° C.; said time t1 is higher than 1 hour and lower than 24; and (d) cooling said SS cell to 25 degree C.; wherein said Chevrel phase having particle's size larger than 30 nanometer and smaller than 5 micrometer.

It is another object of the invention to disclose a method for producing a Chevrel phase cathode represented by the formula of $M_XMo_6S_8$ in which M is copper (Cu); x is higher than 0 and lower than 2. The method comprises steps selected inter alia from (a) milling and squeezing a mixture comprising $MoS_2$, CuS and Mo; (b) heating said mixture in a stainless steel (SS) cell to a temperature T at a rate of about 90° C./h; said temperature T is lower than 1200° C. and higher than 500° C.; (c) heating the mixture in said SS cell to a temperature T1 at a period of time t1; said temperature T1 is lower than 1200° C. and higher than 500° C.; said time t1 is higher than 1 hour and lower than 24; and (d) cooling said SS cell to 25 degree C.; wherein said Chevrel phase having particle's size larger than 30 nanometer and smaller than 5 micrometer.

It is another object of the invention to disclose a method for producing a Chevrel phase cathode represented by the formula of $M_XMo_6S_8$ in which M is copper (Cu); x is higher than 0 and lower than 2. The method comprises steps selected inter alia from (a) milling and squeezing a mixture comprising $MoS_2$, CuS and Mo; (b) purging said mixture with argon for about 1 hour before and during heating; (c) heating said mixture in a stainless steel (SS) cell to a temperature T at a rate of about 150° C./h for a period of time t; said temperature T is lower than 1200° C. and higher than 500° C.; said time t is lower than 48 and higher than 1 hour; and (d) cooling said SS cell to 25 degree C.; wherein said Chevrel phase having particle's size larger than 30 nanometer and smaller than 5 micrometer.

It is another object of the invention to disclose a method for improving the kinetics of magnesium intercalation into a Chevrel phase cathode represented by the formula of $M_XMo_6S_8$ in which M is copper (Cu); x is higher than 0 and lower than 2. The method comprises steps selected inter alia from (a) milling and squeezing a mixture comprising $MoS_2$, CuS and Mo; (b) purging said mixture with argon for about 1 hour before and during heating; (c) heating said mixture in a stainless steel (SS) cell to a temperature T at a rate of about 150° C./h for a period of time t; said temperature T is lower than 1200° C. and higher than 500° C.; said time t is lower than 48 and higher than 1 hour; and (d) cooling said SS cell to 25 degree C.; wherein said Chevrel phase having particle's size larger than 30 nanometer and smaller than 5 micrometer.

It is another object of the invention to disclose a method for producing a Chevrel phase cathode represented by the formula of $M_XMo_6S_8$ in which M is silver (Ag); x is higher than 0 and lower than 2. The method comprises steps selected inter alia from (a) obtaining a mixture comprising of Ag, Mo, S; (b) heating the mixture in a stainless steel (SS) cell to a temperature T at a period of time t; said temperature T is lower than 1200° C. and higher than 500° C.; said time t is higher than 1 hour and lower than 48; (c) heating the mixture in said SS cell to a temperature T1 at a period of time t1; said temperature T1 is lower than 1200° C. and higher than 500° C.; said time t1 is higher than 1 hour and lower than 48; (d) heating the mixture in said SS cell to a temperature T2 at a period of time t2; said temperature T2 is lower than 1200° C. and higher than 500° C.; said time t2 is higher than 1 hour and lower than 50; and (e) cooling said SS cell to 25 degree C. at a rate of 120° C./h; wherein said Chevrel phase having particle's size larger than 30 nanometer and smaller than 5 micrometer.

It is another object of the invention to disclose a method for improving the kinetics of magnesium intercalation into a Chevrel phase cathode represented by the formula of $M_XMo_6S_8$ in which M is silver (Cu); x is higher than 0 and lower than 2. The method comprises steps selected inter alia from (a) obtaining a mixture comprising of Ag, Mo, S; (b) heating the mixture in a stainless steel (SS) cell to a temperature T at a period of time t; said temperature T is lower than 1200° C. and higher than 500° C.; said time t is higher than 1 hour and lower than 48; (c) heating the mixture in said SS cell to a temperature T1 at a period of time t1; said temperature T1 is lower than 1200° C. and higher than 500° C.; said time t1 is higher than 1 hour and lower than 48; (d) heating the mixture in said SS cell to a temperature T2 at a period of time t2; said temperature T2 is lower than 1200° C. and higher than 500° C.; said time t2 is higher than 1 hour and lower than 50; and (e) cooling said SS cell to 25 degree C. at a rate of 120° C./h; wherein said Chevrel phase having particle's size larger than 30 nanometer and smaller than 5 micrometer.

It is another object of the invention to disclose a method for producing a Chevrel phase cathode represented by the formula of $M_XMo_6S_8$ in which M is silver (Ag); x is higher than 0 and lower than 2. The method comprises steps selected inter alia from (a) milling and squeezing a mixture comprising $MoS_2$, $Ag_2S$ and Mo; (b) inserting said mixture in a stainless steel (SS) cell; (c) heating said mixture in said SS cell to a temperature T at a rate of about 90° C./h; said temperature T is lower than 1200° C. and higher than 500° C.; (d) heating the mixture in said SS cell to a temperature T1 at a period of time t1; said temperature T1 is lower than 1200° C. and higher than 500° C.; said time t1 is higher than 1 hour and lower than 24; and (e) cooling said SS cell to 25 degree C.; wherein said Chevrel phase having particle's size larger than 30 nanometer and smaller than 5 micrometer.

It is another object of the invention to disclose a method for improving the kinetics of magnesium intercalation into a Chevrel phase cathode represented by the formula of $M_XMo_6S_8$ in which M is silver (Ag); x is higher than 0 and lower than 2. The method comprises steps selected inter alia from (a) milling and squeezing a mixture comprising $MoS_2$ $Ag_2S$ and Mo; (b) inserting said mixture in a stainless steel (SS) cell; (c) heating said mixture in said SS cell to a temperature T at a rate of about 90° C./h; said temperature T is lower than 1200° C. and higher than 500° C.; (d) heating the mixture in said SS cell to a temperature T1 at a period of time t1; said temperature T1 is lower than 1200° C. and higher than 500° C.; said time t1 is higher than 1 hour and lower than 24; and (e) cooling said SS cell to 25 degree C.; wherein said Chevrel phase having particle's size larger than 30 nanometer and smaller than 5 micrometer.

It is another object of the invention to disclose a method for producing a Chevrel phase cathode represented by the formula of $M_XMo_6S_8$ in which M is silver (Ag); x is higher than 0 and lower than 2. The method comprises steps selected inter alia from (a) milling and squeezing a mixture comprising $MoS_2$, $Ag_2S$ and Mo; (b) purging said mixture with argon for about 1 hour before and during heating; (c) heating said mixture in a stainless steel (SS) cell to a temperature T at a rate of about 150° C./h for a period of time t; said temperature T is lower than 1200° C. and higher than 500° C.; said time t is lower than 48 and higher than 1 hour; and (d) cooling said SS cell to 25 degree C.; wherein said Chevrel phase having particle's size larger than 30 nanometer and smaller than 5 micrometer.

It is another object of the invention to disclose a method for improving the kinetics of magnesium intercalation into a Chevrel phase cathode represented by the formula of $M_XMo_6S_8$ in which M is silver (Ag); x is higher than 0 and lower than 2. The method comprises steps selected inter alia from (a) milling and squeezing a mixture comprising $MoS_2$, $Ag_2S$ and Mo; (b) purging said mixture with argon for about 1 hour before and during heating; (c) heating said mixture in a stainless steel (SS) cell to a temperature T at a rate of about 150° C./h for a period of time t; said temperature T is lower than 1200° C. and higher than 500° C.; said time t is lower than 48 and higher than 1 hour; and (d) cooling said SS cell to 25 degree C.; wherein said Chevrel phase having particle's size larger than 30 nanometer and smaller than 5 micrometer.

It is another object of the invention to disclose a method for producing a Chevrel phase cathode represented by the formula of $M_XMo_6S_8$ in which M is nickel (Ni); x is higher than 0 and lower than 2. The method comprises steps selected inter alia from (a) obtaining a mixture comprising of Ni, Mo, S; (b) heating the mixture in a stainless steel (SS) cell to a temperature T at a period of time t; said temperature T is lower than 1200° C. and higher than 500° C.; said time t is higher than 1 hour and lower than 48; (c) heating the mixture in said SS cell to a temperature T1 at a period of time t1; said temperature T1 is 1 lower than 1200° C. and higher than 500° C.; said time t1 is higher than 1 hour and lower than 48; (d) heating the mixture in said SS cell to a temperature T2 at a period of time t2; said temperature T2 is lower than 1200° C. and higher than 500° C.; said time t2 is higher than 1 hour and lower than 50; and (e) cooling said SS cell to 25 degree C. at a rate of 120° C./h; wherein said Chevrel phase having particle's size larger than 30 nanometer and smaller than 5 micrometer.

It is another object of the invention to disclose a method for improving the kinetics of magnesium intercalation into a Chevrel phase cathode represented by the formula of $M_XMo_6S_8$ in which M is nickel (Ni); x is higher than 0 and lower than 2. The method comprises steps selected inter alia from (a) obtaining a mixture comprising of Ni, Mo, S; (b) heating the mixture in a stainless steel (SS) cell to a temperature T at a period of time t; said temperature T is lower than 1200° C. and higher than 500° C.; said time t is higher than 1 hour and lower than 48; (c) heating the mixture in said SS cell to a temperature T1 at a period of time t1; said temperature T1 is lower than 1200° C. and higher than 500° C.; said time t1 is higher than 1 hour and lower than 48; (d) heating the mixture in said SS cell to a temperature T2 at a period of time t2; said temperature T2 is lower than 1200° C. and higher than 500° C.; said time t2 is higher than 1 hour and lower than 50; and (e) cooling said SS cell to 25 degree C. at a rate of 120° C./h; wherein said Chevrel phase having particle's size larger than 30 nanometer and smaller than 5 micrometer.

It is another object of the invention to disclose a method for producing a Chevrel phase cathode represented by the formula of $M_XMo_6S_8$ in which M is nickel (Ni); x is higher than 0 and lower than 2. The method comprises steps selected inter alia from (a) milling and squeezing a mixture comprising $MoS_2$, NiS and Mo; (b) inserting said mixture in a stainless steel (SS) cell; (c) heating said mixture in said SS cell to a temperature T at a rate of about 90° C./h; said temperature T is 1 lower than 1200° C. and higher than 500° C.; (d) heating the mixture in said SS cell to a temperature T1 at a period of time t1; said temperature T1 is lower than 1200° C. and higher than 500° C.; said time t1 is higher than 1 hour and lower than 24; and (e) cooling said SS cell to 25 degree C.; wherein said Chevrel phase having particle's size larger than 30 nanometer and smaller than 5 micrometer.

It is another object of the invention to disclose a method for improving the kinetics of magnesium intercalation into a Chevrel phase cathode represented by the formula of $M_XMo_6S_8$ in which M is nickel (Ni); x is higher than 0 and lower than 2. The method comprises steps selected inter alia from (a) milling and squeezing a mixture comprising $MoS_2$, NiS and Mo; (b) inserting said mixture in a stainless steel (SS) cell; (c) heating said mixture in said SS cell to a temperature T at a rate of about 90° C./h; said temperature T is lower than 1200° C. and higher than 500° C.; (d) heating the mixture in said SS cell to a temperature T1 at a period of time t1; said temperature T1 is 1 lower than 1200° C. and higher than 500°

C.; said time t1 is higher than 1 hour and lower than 24; and (e) cooling said SS cell to 25 degree C.; wherein said Chevrel phase having particle's size larger than 30 nanometer and smaller than 5 micrometer.

It is another object of the invention to disclose a method for producing a Chevrel phase cathode represented by the formula of $M_xMo_6S_8$ in which M is nickel (Ni); x is higher than 0 and lower than 2. The method comprises steps selected inter alia from (a) milling and squeezing a mixture comprising $MoS_2$, NiS and Mo; (b) purging said mixture with argon for about 1 hour before and during heating; (c) heating said mixture in a stainless steel (SS) cell to a temperature T at a rate of about 150° C./h for a period of time t; said temperature T is lower than 1200° C. and higher than 500° C.; said time t is lower than 48 and higher than 1 hour; and (d) cooling said SS cell to 25 degree C.; wherein said Chevrel phase having particle's size larger than 30 nanometer and smaller than 5 micrometer.

It is another object of the invention to disclose a method for improving the kinetics of magnesium intercalation into a Chevrel phase cathode represented by the formula of $M_xMo_6S_8$ in which M is nickel (Ni); x is higher than 0 and lower than 2. The method comprises steps selected inter alia from (a) milling and squeezing a mixture comprising $MoS_2$, NiS and Mo; (b) purging said mixture with argon for about 1 hour before and during heating; (c) heating said mixture in a stainless steel (SS) cell to a temperature T at a rate of about 150° C./h for a period of time t; said temperature T is lower than 1200° C. and higher than 500° C.; said time t is lower than 60 and higher than 1 hour; and (d) cooling said SS cell to 25 degree C.; wherein said Chevrel phase having particle's size larger than 30 nanometer and smaller than 5 micrometer.

It is another object of the invention to disclose the magnesium rechargeable battery as defined above, wherein said magnesium-aluminum complex is $(PhMgCl)_2$—$AlCl_3$ in which Ph is phenyl; in THF.

It is another object of the invention to disclose the magnesium rechargeable battery as defined above, wherein the electrochemical window is higher than 3V; further wherein the concentration of $AlCl_3$ is 0.4M; further wherein said conductivity is 5 mS/cm at room temperature.

BRIEF DESCRIPTION OF THE DRAWINGS

The invention is herein described, by way of example only, with reference to the accompanying drawings, wherein:

FIG. 19 is a table that summarizes values of the over potential for magnesium deposition and the reversibility of magnesium deposition for APC solutions (THF) of different composition and concentration measured with Pt electrodes. Similar data for a BEC, reference solution (0.25M, THF) is also presented.

FIG. 20 is a table displaying the shift and the width of $^{27}$Al NMR peaks of various aluminum compounds that are formed in APC solutions, based on the measurements of solutions with different ratios between PhMgCl and AlCl$_3$.

DETAIL DESCRIPTION OF THE SPECIFIC EMBODIMENTS

Figure 1:
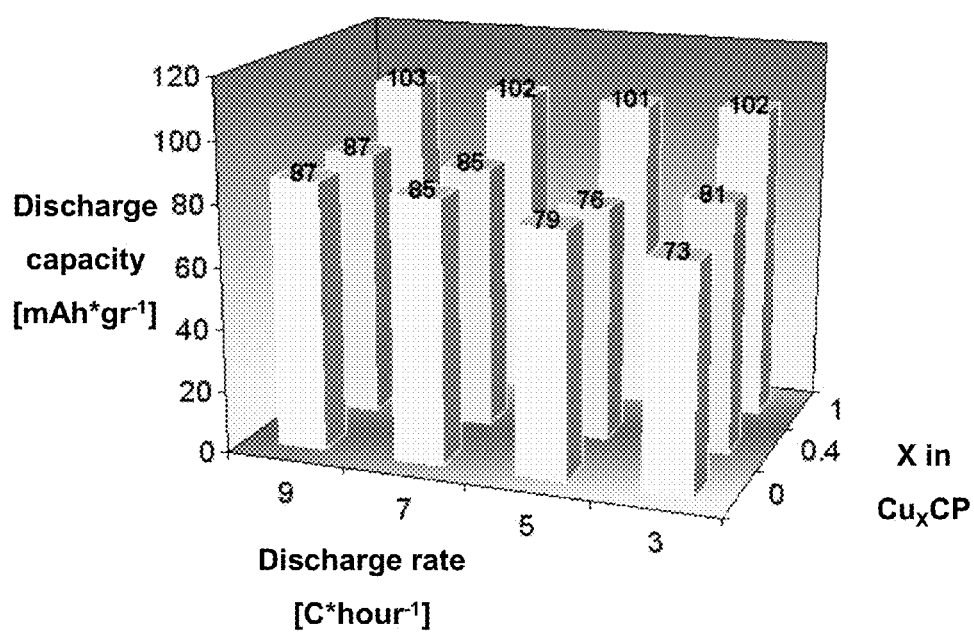
FIG. 1 is a graph displaying the rate capability at 25° C. of $Cu_xCP(X=0, 0.4, 1)$.

The following description is provided, alongside all chapters of the present invention, so as to enable any person skilled in the art to make use of said invention and sets forth the best modes contemplated by the inventor of carrying out this invention. Various modifications, however, is adapted to remain apparent to those skilled in the art, since the generic principles of the present invention have been defined specifically to provide a rechargeable magnesium batteries.

The present invention is a new rechargeable magnesium battery based on magnesium metal as an anode material, a modified Chevrel phase as an intercalation cathode for magnesium ions and an electrolyte solution from which magnesium can be deposited reversibly, which have a very wide electrochemical window that is larger than 3 V.

The term "Cyclic voltammetry" refers hereinafter to a type of potentiodynamic electrochemical measurement. To obtain a cyclic voltammogram, the voltage is varied in a solution and the change in current is measured with respect to the change in voltage. It is a specific type of voltammetry used for studying the redox properties of chemicals and interfacial structures.

The term "about" refers hereinafter to a range of 25% below or above the referred value.

The term "Self-discharge" refers hereinafter to a phenomenon in batteries in which internal chemical reactions reduce the stored charge of the battery without any connection between the electrodes. Self-discharge decreases the shelf-life of batteries and causes them to have less charge than expected when actually put to use.

The term "Deep Cycle Batteries" refers hereinafter to batteries, which are designed to be discharged down as much as 80% time after time, and have much thicker plates. The major difference between a true deep cycle battery and others is that the plates are SOLID Lead plates—not sponge. Deep cycle batteries are used where discharging and charging occurs frequently.

The term "intercalation" refers hereinafter to the reversible inclusion of a molecule (or group) between two other molecules (or groups).

The term "electrochemical window" of a substance refers hereinafter to the voltage range between which the substance doesn't get oxidized or reduced. This range is important for the efficiency of an electrode.

The term "High Resolution Transmission Electron Microscopy (HRTEM)" refers hereinafter to an imaging mode of the transmission electron microscope (TEM) that allows imaging of the surface structure of a sample at an atomic scale. Because of its high resolution, it is an invaluable tool to study nanoscale properties of crystalline material such as semiconductors and metals.

The term "THF" refers hereinafter to Tetrahydrofuran or 1,4-epoxybutane.

The term "PVDF" refers hereinafter to Polyvinylidene difluoride or poly-1,1-difluoroethene.

The term "Differential Scanning Calorimetry (DSC)" refers hereinafter to a thermoanalytical technique in which the difference in the amount of heat required to increase the temperature of a sample and reference are measured as a function of temperature.

Before explaining the figures, it should be understood that the invention is not limited in its application to the details of construction and the arrangement of the components set forth in the following description or illustrated in the drawings. The invention can be carried out in various ways.

The present invention provides ways to avoid the trapping and the movement of Mg$^{2+}$ ions in a circuitous manner between their sites, but instead, enables the progressive diffusion of Mg ions between different types of sites needed for the normal function of the electrode material. The first is to use the compounds with a partial substitution of S by Se, Mo$_6$S$_{8-y}$Se$_y$, while the second way is to use a metal-containing material, M$_x$Mo$_6$S$_8$. In both cases, the variations in the composition of the Chevrel phases lead to energetic changes in the Mg$^{2+}$ ion motion and to the progressive Mg diffusion in the bulk of the active mass, instead of the local circuit one. The absence of trapping in these materials is associated with the high kinetics of Mg diffusion at all stages of the electrochemical process. As a result, in contrast to the metal-free Mo$_6$S$_8$ proposed previously, the improved cathode materials described herein show a high rate capability. Reference is now made to FIG. 1 which is graph displaying the rate capability of Cu$_x$Mo$_6$S$_8$ (X=0, 0.4, 1) at 25° C. As can be seen from FIG. 1 a, 100 mA*h/g can be realized upon cycling with high current density.

The present invention also provides electrolyte solutions from which magnesium can deposit reversibly. It is well know in the literature that Mg can be deposit reversibly from solution of Gringard reagents in ethereal solvents. However, such solutions cannot be used as electrolytes solutions in real batteries due to their low oxidation potential. In order to overcome the low oxidation potential, a family of electrolyte solutions was proposed. This family is based on complex salts with the general formula Mg(AlR$_x$Cl$_{4-x}$)$_2$ in ether solvents, from which magnesium can be deposited in 100% reversibility, and its electrochemical window is wide enough to enable its use for battery applications. However, these electrolytes suffer from several disadvantages. The main disadvantage is their relatively low conductivity—one order of magnitude as compared to lithium ion batteries.

The present invention provides electrolyte solutions with improved ionic conductivity. By adding an inert salt to THF/Mg(AlR$_x$Cl$_{4-x}$)$_2$ solutions, their conductivity increased without damaging the electrochemical properties of the solution. Tetrabutylamonium-chloride was tested as possible inert salt. Although this salt is not soluble in pure THF, it could be dissolved easily in THF/Mg(AlR$_x$Cl$_{4-x}$x)$_2$ solutions up to 0.5M. This fact pointed out that the solubility of TBACl in THF/DCC solutions is probably due to interaction with the solution components. The same phenomenon was obtained when LiCl replaced TBACl. LiCl has a limited solubility in THF and the obtained solution has very low conductivity. In that case the solubility is probably due to creation of molecular complex of LiCl with THF. The addition of both TBACl and LiCl increase the conductivity of the THF/Mg(AlR$_x$ $Cl_{4-x})_2$ solutions up to 20% with direct correlation to the added concentrations. Moreover, an improvement in the electrochemical performance was determined in several aspects.

Figure 2:
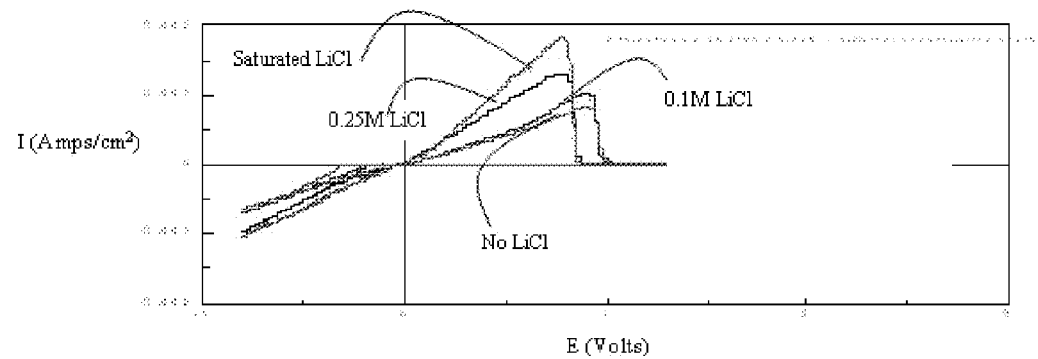
FIG. 2 is a graph displaying comparison of the voltammetric profiles obtained in pure $THF/Mg(AlEtBuCl_2)_2$ 0.25M and in solutions containing different concentrations of LiCl.

Reference is now made to FIG. 2 which presents comparison of the voltammetric profiles obtained from pure THF/Mg (AlEtBuCl$_2$)$_2$ 0.25M and from solutions containing different concentrations of LiCl. From the representative voltammograms, the overpotential for magnesium deposition is about 25% of the value obtained from pure THF/Mg(AlEtBuCl$_2$)$_2$ solutions. In addition, the current densities for both deposition and dissolution of magnesium are much higher from solutions containing LiCl as compared to pure solutions.

Figure 3:
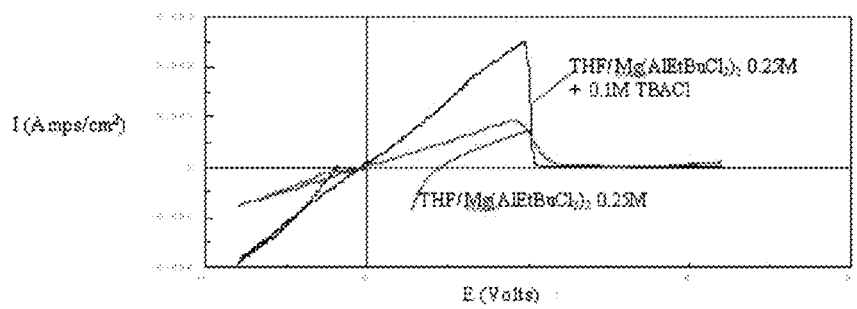
FIG. 3 is a graph displaying the voltammetric profiles obtained in pure $THF/Mg(AlEtBuCl_2)_2$ 0.25M and in the same solution containing 0.1M TBACl.

Reference is now made to FIG. 3 which compares the voltammetric profiles obtained from pure THF/Mg(AlEtBuCl$_2$)$_2$ 0.25M and from the same solution containing 0.1M TBACl. From the representative voltammograms it can be seen that similar behaviour is obtained due to TBACl addition.

Figure 4:
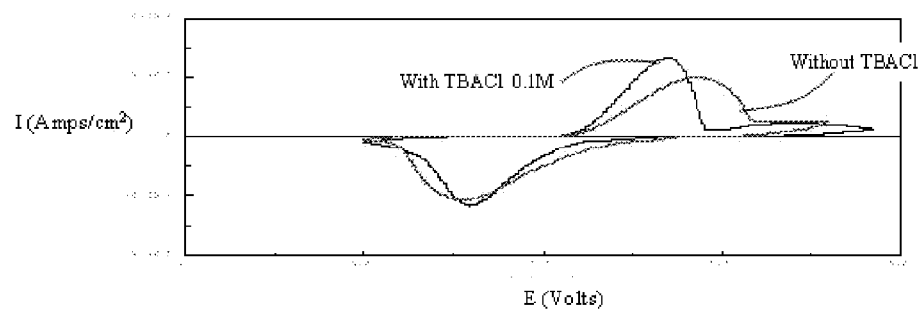
FIG. 4 is displays the SSCV (slow scan cyclic voltammetry) curves obtained upon intercalation-deintercalation of magnesium ions into/from $Mo_6S_8$ (Chevrel phase structure) in $THF/Mg(AlEtBuCl_2)_2$ 0.25M solutions without and with TBACl addition. The solution contained 0.1M TBACl.
Figure 5:
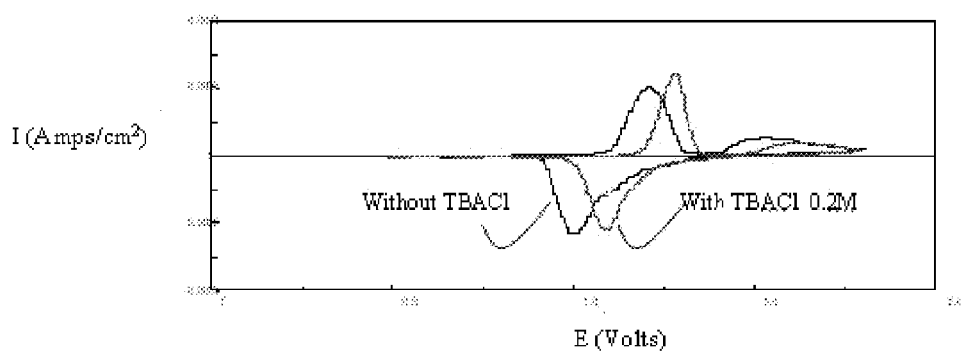
FIG. 5 is displays the SSCV curves obtained upon intercalation-deintercalation of magnesium ions into/from $Mo_6S_8$ (Chevrel phase structure) in $THF/Mg(AlEtBuCl_2)_2$ 0.25M solutions without and with TBACl addition. The solution contained 0.2M TBACl.

Reference is now made to FIGS. 4 and 5 which present voltammograms obtained by slow scan cyclic voltammetry (SSCV) measurements upon intercalation-deintercalation of magnesium ions into/from Mo$_6$S$_8$ (Chevrel phase structure) in THF/Mg(AlEtBuCl$_2$)$_2$ 0.25M solutions without and with TBACl addition. FIGS. 4 and 5 present profiles measured in solution containing 0.1M and 0.2M TBACl, respectively. When the added TBACl concentration is 0.1M, a small improvement in the kinetic could be observed both in the shift in the peak position and in the changes in the peak width. When the added TBACl concentration is 0.2M, these changes are much pronounced, as can be seen in the voltammograms presented in FIG. 5.

Therefore, the addition of TBACl to THF/Mg(AlR$_2$Cl$_2$)$_2$ solution improved slightly the kinetic of magnesium intercalation into Mo$_6$S$_8$, although there is no significant influence on the specific capacity and the energy density obtained in the process. Therefore, the addition of salts from the tetraalkylamonium chloride family to THF/Mg(AlR$_2$Cl$_2$)$_2$ electrolyte solutions produced solutions that contain different species compare to the original THF/Mg(AlR$_2$Cl$_2$)$_2$. The electrochemical performances of the new solutions are improved both in term of conductivity, kinetic of magnesium deposition-dissolution process and the kinetic of the magnesium intercalation-deintercalation process into Mo$_6$S$_8$.

Figure 6:
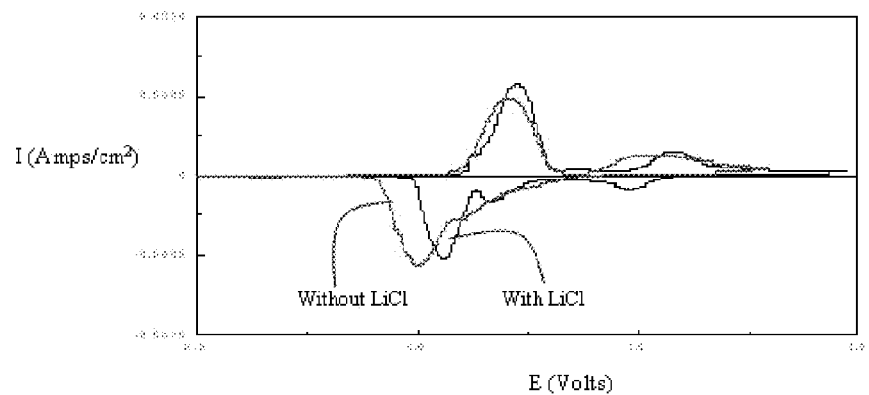
FIG. 6 is a graph displaying SSCV curves obtained upon intercalation-deintercalation of Mg and/or Li cations into/from $Mo_6S_8$ in $THF/Mg(AlEtBUCl_2)_2$ 0.25M solutions with and without LiCl.
Figure 7:
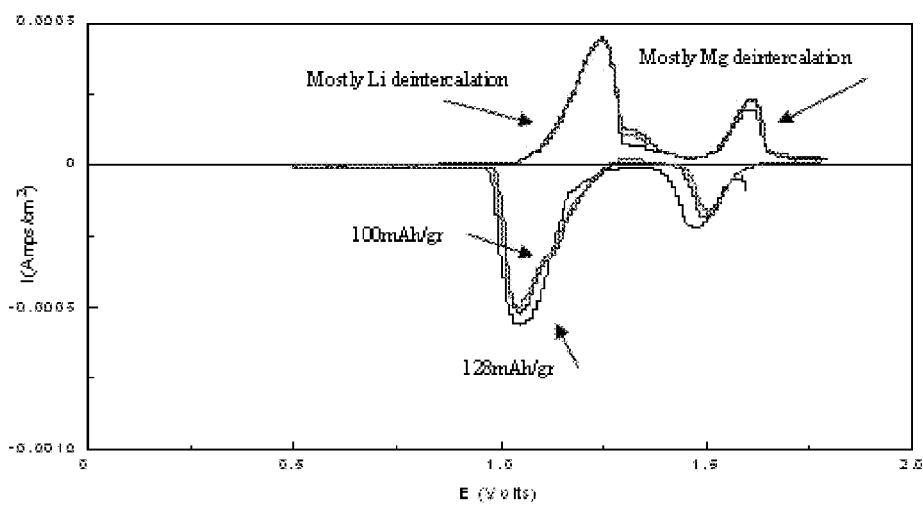
FIG. 7 is a graph displaying SSCV voltammograms measured in solution containing 0.004M LiCl in THF/DCC 0.25M.

Reference is now made to FIG. 6 which presents voltammograms of intercalation-deintercalation process into/from Mo$_6$S$_8$ in THF/Mg(AlEtBuCl$_2$)$_2$ 0.25M solutions with and without LiCl. When LiCl is added to THF/Mg(AlR$_2$Cl$_2$)$_2$ electrolyte solutions, a solution containing both lithium and magnesium ions is produced. Lithium cannot be deposited instead of magnesium in the anode side due to its lower reduction potential as compared to magnesium. However, in the cathode side, lithium intercalation is much favorite as compared to magnesium intercalation, mainly due to much faster kinetic of the intercalation process. Therefore, when LiCl content in solution is high enough, only lithium intercalation would occur. When there is no addition of LiCl, only magnesium intercalation occurs at 1-1.1V. In this case 25% of the capacity intercalate at 1.5V and the other 75% at 1.1V, which is similar to the potential of magnesium intercalation. Then, theoretical capacity (125 mAh/gr) can be obtained at 100% reversibility for many cycles. That's in contrary to magnesium intercalation process, in which about 10% of the magnesium ions get trapped in the structure after the first intercalation and cannot be charged out at room temperature due to kinetic limitations. Therefore, only 95-100 mAh/gr can be obtained by magnesium intercalation into Chevrel phase at room temperature. However, when the LiCl content in solution is lower, a mix intercalation of lithium and magnesium will take place. Lithium ions will intercalate first, due to their faster kinetics, but these ions will also deintercalated first. Therefore, the end of the process remains deintercalation of magnesium ions. This process cannot be completed at room temperature due to its poor kinetic, and only 85-90% of the theoretical capacity can be—obtained upon cycling in THF/Mg(AlR$_2$Cl$_2$)$_2$ solutions without addition of LiCl. This situation is demonstrated in the FIG. 7, which presents voltammograms that were measured in solution containing 0.004M LiCl in THF/DCC 0.25M.

Under this condition mix intercalation was obtained as was proven by elemental analysis. The magnesium to lithium ratio in full intercalation is 1.22. Elemental analysis also shows that the first deintercalation process is indeed mostly lithium deintercalation and the second one is mostly magnesium intercalation. The first cycle yields 128 mAh/gr and the sequence cycles—only 100 mAh/gr.

Therefore, the addition of LiCl to THF/Mg(AlR$_2$Cl$_2$)$_2$ has a very unique influence on the electrolyte properties. In addition to the new aluminum and magnesium species that are formed and have some influence on the kinetic of the magnesium intercalation, as was demonstrated in solution containing TBACl, a double metallic cations solution (magnesium and lithium ions) is producing. This unique situation allowed fully or partially lithium intercalation at the cathode side and magnesium deposition-dissolution in the anode side. In such way, the future battery will have the benefits of magnesium anode and lithium intercalation cathode.

Figure 8A:
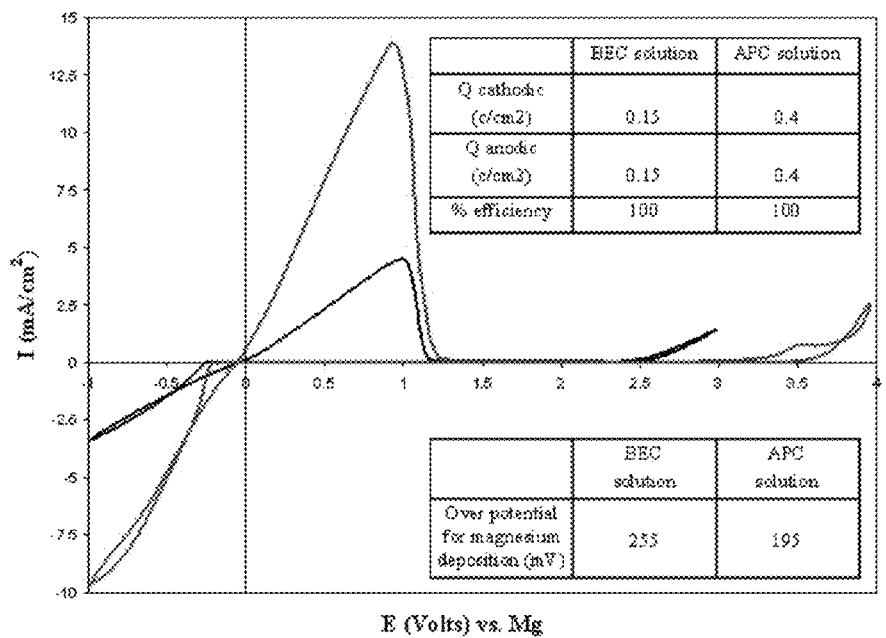
FIG. 8A is a graph displaying a comparison between typical steady state cyclic voltammograms obtained with 0.25 M $Mg(AlCl_2BuEt)_2$ (denoted as BEC) and 0.4 M PhMgCl—$AlCl_3$ 2:1 (denoted as APC) solutions in THF with Pt electrodes.

Reference is now made to FIG. 8A, which is a graph displaying a comparison between typical steady state cyclic voltammograms obtained with 0.25 M Mg(AlCl$_2$BuEt)$_2$ (denoted as BEC) and 0.4 M PhMgCl—AlCl$_3$ 2:1 (denoted as APC) solutions in THF with Pt electrodes. The overpotentials for Mg deposition, the relevant charges of the processes and the efficiency of Mg deposition-dissolutions are also indicated in FIG. 1. This figure demonstrates the superiority of the APC over the BEC solutions in three aspects: Higher anodic stability by nearly 1 V, lower overpotential for Mg deposition and higher capacity for the reversible Mg deposition-dissolution processes.

Reference is now made to FIG. 19, which summarizes values of the over potential for magnesium deposition and the reversibility of magnesium deposition for APC solutions (THF) of different composition and concentration measured with Pt electrodes. Similar data for a BEC, reference solution (0.25M, THF) is also presented.

Figure 8B:
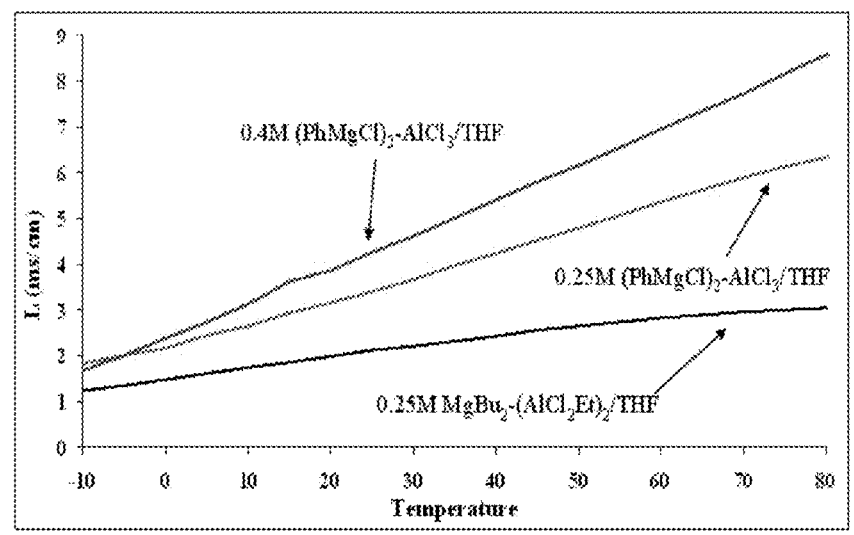
FIG. 8B is a graph displaying the temperature dependence of the specific conductivity of 0.25 M $MgBu_2$-$(AlCl_2Et)_2$ (BEC, the reference solution), 0.25 M and 0.4 M $(PhMgCl)_2$—$AlCl_3$ (APC) solutions in THF.
Figure 8C:
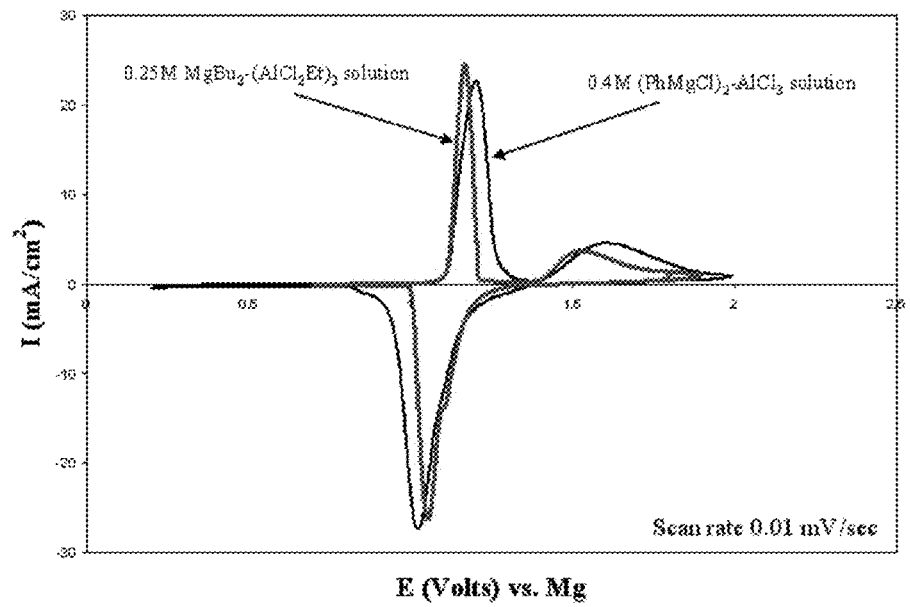
FIG. 8C is a graph displaying a steady state slow scanning rate cyclic voltammograms of composite $Mg_xMo_6S_8$ electrodes (comprising 80% active mass, 10% PVDF binder and 10% carbon black) in BEC and APC solutions as indicated (vs. Mg foils reference and counter electrodes).
Figure 8D:
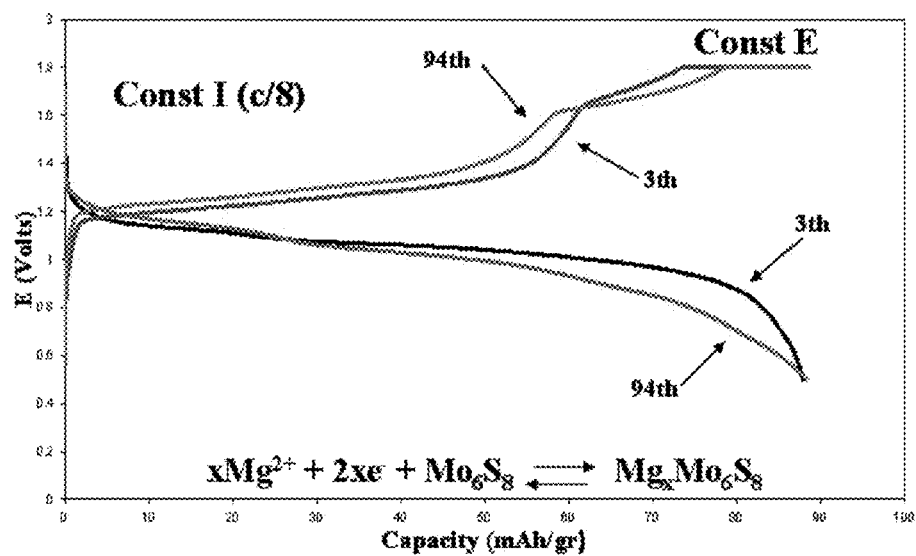
FIG. 8D is a graph that compares typical voltage profiles of these cells at the $3^{rd}$ and the $94^{th}$ cycles.

Reference is now made to FIG. 8B, which is a graph displaying the temperature dependence of the specific conductivity of 0.25 M MgBu$_2$-(AlCl$_2$Et)$_2$ (BEC, the reference solution), 0.25 M and 0.4 M (PhMgCl)$_2$—AlCl$_3$ (APC) solutions in THF. The latter solution demonstrates the higher specific conductivity. At room temperature 4-5 S/cm were measured, values similar to that of standard electrolyte solutions for Li batteries. The voltammetric experiments and the conductivity measurements show that the solutions comprising the (PhMgCl)$_2$—AlCl$_3$ complex at concentration of 0.4 M, demonstrate the best properties: the lowest over-potential for Mg deposition, high anodic stability—a potential window >3 V, 100% efficiency of Mg deposition-dissolution cycling (i.e. full reversibility) and the highest conductivity. Therefore, all further electrochemical measurements were conducted using these solutions. Reference is now made to FIG. 8C, which is a graph displaying a steady state slow scanning rate cyclic voltammograms of composite Mg$_x$Mo$_6$S$_8$ electrodes (comprising 80% active mass, 10% PVDF binder and 10% carbon black) in BEC and APC solutions as indicated (vs. Mg foils reference and counter electrodes). In general, the voltammetric study of these systems showed that Mg ions intercalate reversibly into $Mg_xMo_6S_8$ (0<x<2) electrodes in two stages (the voltammograms include two sets of peaks where the two cathodic peaks overlap). As expected, the practical capacity of these cathodes in both solutions is lower at room temperature by 20-25% from the theoretical value (122 Wh/Kg) due to the well discussed and understood partial charge trapping phenomenon. The peaks' separation in the voltammogram related to the APC solution is wider than that observed for the BEC solution, what indicates a more sluggish kinetics of Mg ions insertion into these cathodes in the former solutions. Reference is now made to FIG. 8D, which is a graph that compares typical voltage profiles of these cells at the $3^{rd}$ and the $94^{th}$ cycles. While there are slight changes in the shape of the voltage profiles as cycling proceeds, the capacity, calculated based on the weight of the cathode's active mass, remains stable. As demonstrated in a parallel publication, it is possible to synthesize improved Chevrel phase cathode materials, with which the partial charge-trapping phenomenon is alleviated, and capacities close to the theoretical value can be obtained. In general, these batteries could be cycled hundreds of times showing stable performance. In these battery systems there are no side reactions. Mg electrodes are completely inert, and passivation is free in all of these complex electrolyte-ethereal solutions. Also, the red-ox activity of the Chevrel phase cathodes falls well within the electrochemical window of these solutions with no side reactions as well. Thereby, it is expected that these systems should have very prolonged cycle-ability, better than all other rechargeable battery systems known to date. However, the duration of the experiments carried out in the framework of the present study was limited due to inevitable evaporation of the THF solvent through the plastic gaskets of the coin type cells.

Figure 8E:
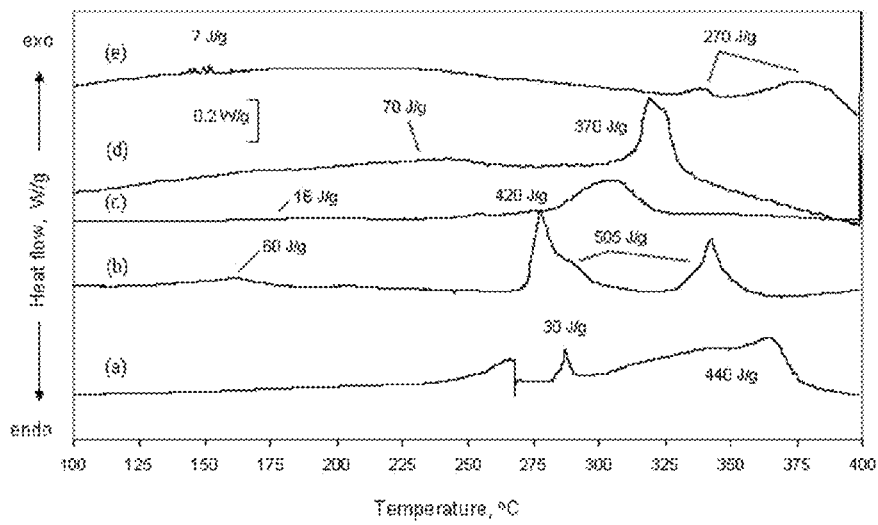
FIG. 8E is a graph displaying a DSC profiles (power emitted vs. temperature in the course of continuous heating) and specific heat of reactions (marked near the peaks) for—(a) 3 mg of APC solution, (b) 3.2 mg of APC solution in contact with 2.5 mg of Mg metal, (c) 2 mg of APC solution in contact with 6 mg $Mo_6S_8$ Chevrel phase, (d) 1 mg of APC solution with 7.6 mg $Mg_2Mo_6S_8$ Chevrel phase, (e) 1.7 mg of APC solution in contact with 2.5 mg Mg metal and 2.2 mg $Mg_2Mo_6S_8$.
Figure 8F:
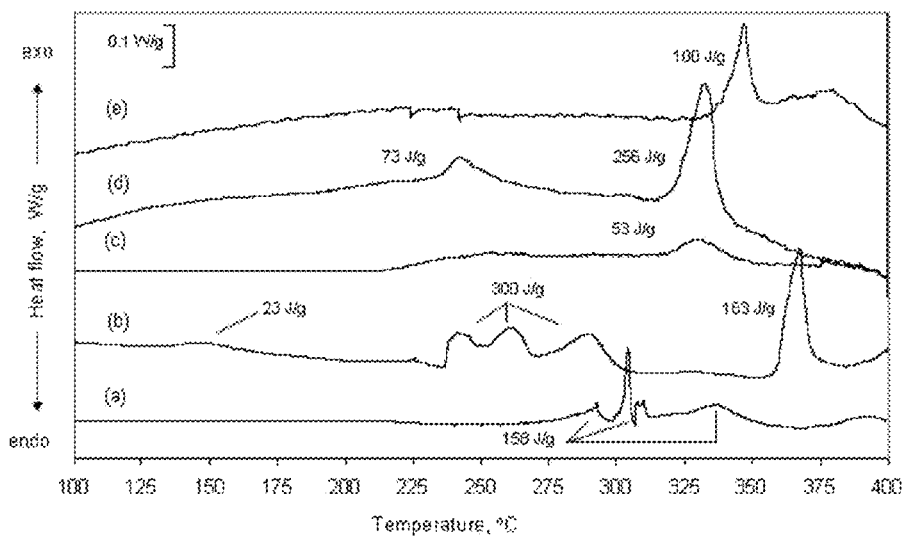
FIG. 8F is a graph displaying a DSC profiles (power emitted vs. temperature in the course of continuous heating) and specific heat of reactions (marked near the peaks) for—(a) 3.3 mg of BEC solution; (b) 3.6 mg of BEC solution in contact with 2.5 mg of Mg metal; (c) 1.6 mg of BEC solution with 6.2 mg $Mo_6S_8$ Chevrel phase; (d) 1 mg of BEC solution with 5.7 $Mg_2Mo_6S_8$ Chevrel phase; (e) 1.3 mg of BEC solution in contact with 2.5 mg Mg metal and 3 mg $Mg_2Mo_6S_8$.

Reference is now made to FIGS. 8E and 8F, which compare the thermal behavior of APC and BEC solutions (respectively), studied by DSC. A sets of experiments were carried out: the solutions themselves, solutions+magnesium foil, solutions+$Mo_6S_8$, solutions+$Mg_2Mo_6S_8$ and all batteries components–solutions+Mg+$Mg_2Mo_6S_8$. Heat flow (W/g solution) for all the thermal processes in the above systems, is plotted as a function of temperature (in the course of heating at a constant rate of 1° C./min). Each of the 10 curves presented in FIGS. 8E and 8F exhibits several exothermic processes appearing as positive peaks. The relevant specific heats involved in the main processes, are indicated near the peaks. In general, the thermal behavior of the two systems based on BEC and APC solutions is somewhat similar. The pure solutions show some thermal activity at temperatures above 250° C. The APC solutions exhibit an interesting starting around 250° C.: an exotherm starts and continues as an endothermic process as heating proceeds (see the positive shoulder in the first curve of FIG. 8E, which is followed by a spike which goes down). The main thermal processes of both solutions are exothermic reactions that emit a few hundreds of J/gr (have not yet been explored). These solutions demonstrate much higher thermal stability than standard solutions for Li ion batteries, which exhibit pronounced exothermic red-ox activity with onset temperatures below 200° C. and with specific heat emission several times higher than that of the BEC or APC ethereal solutions. As expected, mixtures of the above solutions with Mg metal, exhibit more intensive thermal activity than the neat solutions (see the second curve in FIGS. 8E, 8F). This includes a minor process around 150° C. and two sets of main thermal processes are measured in the temperature ranges 225-300° C. and 325-375° C. for both systems. The onset temperature of the main thermal process of the APC/Mg system is higher by 30° C. than that for the BEC/Mg system. This thermal behavior of the THF/APC or THF/BEC with magnesium is much weaker in terms of higher onset and lower heat generation, compared to mixtures of standard solutions for Li or Li ion batteries with anode materials such as Li or lithiated graphite. The thermal behavior of APC solutions with $Mo_6S_8$ or $Mg_2Mo_6S_8$ powders exhibits exothermic reactions at onset temperatures higher than 275 and 300° C., respectively.

The APC solutions seem to be more stable thermally with the Chevrel phase (CP) cathode materials than mixtures based on BEC solutions. It should be noted that the mixture of APC or BEC/THF solutions with the CP cathodes are much more thermally stable than mixtures of standard solutions for Li ion batteries and Li insertion cathodes such as $LiCoO_2$. Highly interesting is the fact that the weakest thermal activity was observed for both electrolyte solutions (APC, BEC) when the mixtures contained solutions with both Mg metal and $Mg_2Mo_6S_8$. This finding is important, because it reflects encouraging safety features for rechargeable Mg batteries, specially since the ratio among the components (Mg metal, cathode's active mass and electrolyte solution) in these experiments was not too far from that, which exists in practical battery systems. Since the possible high temperature reactions of these systems have not been explored yet (beyond the scope of this study), we cannot explain the thermal behavior of the systems, presented in FIGS. 8E, 8F. However, we encounter here an interesting phenomenon: due to some interrelation between their thermal reactions with the solutions, the presence of both anode and cathode components in these systems, damps the overall thermal activity, compared to that of the binary (solution/Mg or solution $Mg_xMo_6S_8$) systems.

Figure 9:
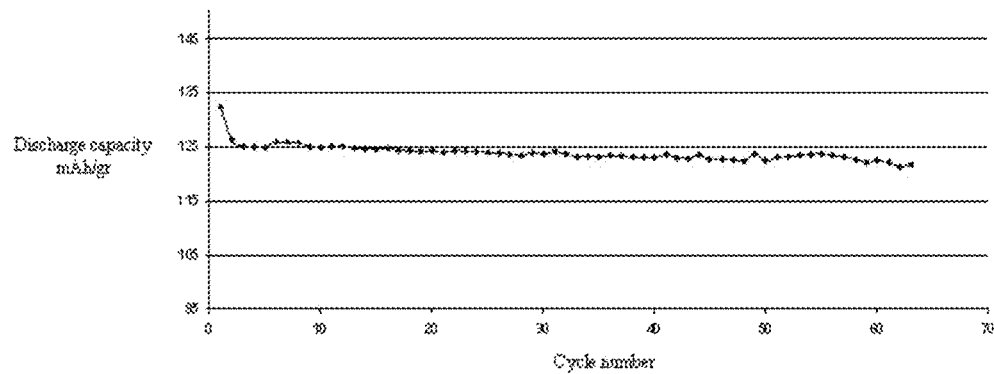
FIG. 9 is a graph displaying a typical discharge capacity vs. cycle number curve.
Figure 10:
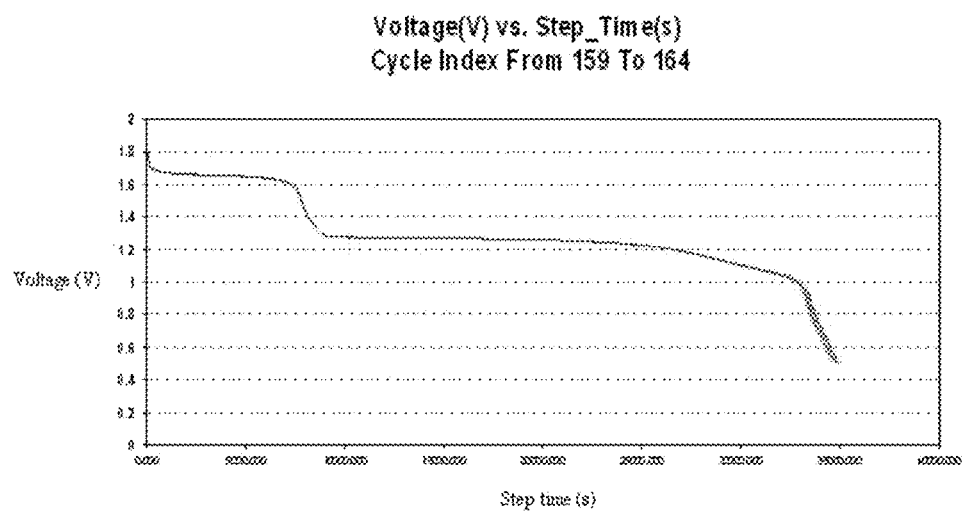
FIG. 10 is a graph displaying the potential-time curve.

Based on the improved properties of the new electrolyte solutions, coin cells batteries containing different compositions of added salts (salt type, salt concentration) and different cathode loads was assembled and tested. Reference is now made to FIG. 9, which presents a typical discharge capacity vs. cycle number curve obtained for batteries containing enough LiCl for full lithium intercalation. Full theoretical capacity (125 mAh/gr) could be obtained under these conditions for many cycles. Part of the lithium intercalation process occurs at higher potential compare to magnesium intercalation. This behavior can be seen from the potential-time curve measured from the same battery that is presented in FIG. 10.

Figure 11:
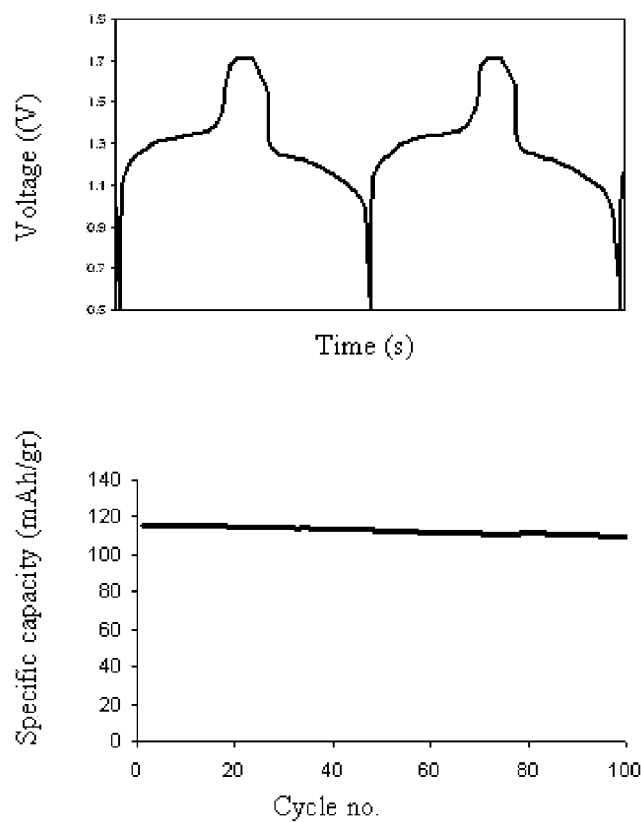
FIG. 11 is a typical specific capacity vs. cycle no. curve and potential profile measured for typical battery.

Reference is now made to FIG. 11 which presents a typical specific capacity vs. cycle no. curve and potential profile measured for typical battery under these conditions. When the LiCl content is two low for full lithium intercalation, a mix magnesium and lithium intercalation occurred.

Figure 12:
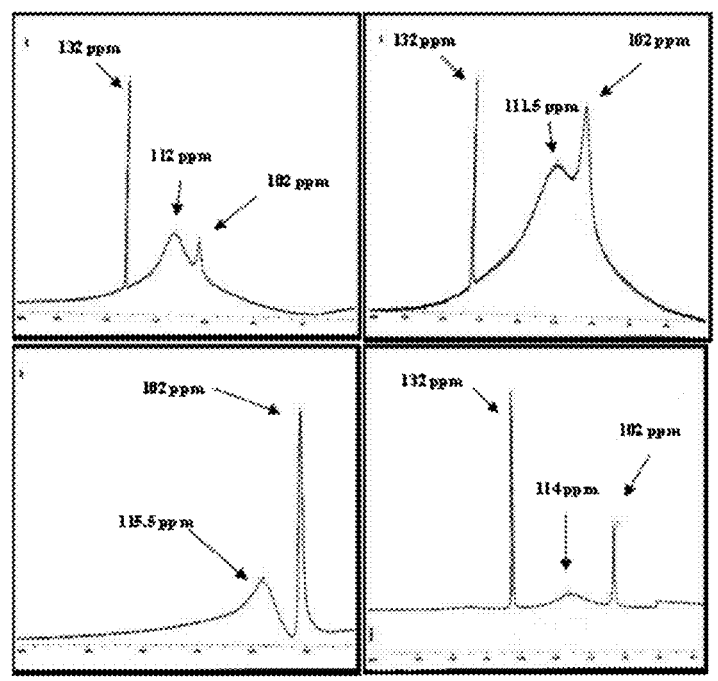
FIG. 12 is a graph displaying the $^{27}Al$ NMR spectra measured with APC solution of the following compositions PhMgCl: $AlCl_3$ (a) 4:3 (b) 1:1 (c) 3:2 (d) 2:1.

Coin cells' batteries containing electrolyte solutions based on THF/Mg($AlR_2Cl_2$)$_2$ with TBACl additions obtained similar performance to those presented in FIG. 11. Referring now to the structure of the new electrolyte solution. FIG. 12, which is a graph displaying the $^{27}Al$ NMR spectra measured with APC solution of the following $PhMgCl$:$AlCl_3$ ratios: (a) 4:3 (b) 1:1 (c) 3:2 (d) 2:1.

Deciphering the chemical structure of the APC solutions is an important for understanding their properties. Based on previous studies of complex solutions with all alkyl ligands, it is clear that the best tool for studying the structure of these solutions is multinuclear NMR spectroscopy. The analysis of these solutions may suffer from the fact that there is no library of reference spectra available for possible components of these systems. Moreover, most of the relevant solution components are not readily available and have to be prepared ad-hoc by reacting the precursors at proportions that ensure the formation of definite dominant species (which NMR spectra can be measured and analyzed unambiguously).

Starting with $^{25}$Mg NMR, a wide peak at 2-3 ppm, was observed when measuring the resonance frequency of Mg of all solutions containing the precursor PhMgCl. Therefore, it is assumed that all the solutions contain Mg ions with a coordination number of 6. It is known from previous studies that this structure might correspond to $MgCl_2$, $MgCl^+$ or $Mg_2Cl_3^+$. No indication of a Mg—C bond was observed in the $^{25}$Mg NMR spectra of solutions containing $(PhMgCl)_x$—$(AlCl_3)_y$, complexes, what confirms that a complete trans-metalation of the ligans occurs, thus, no residue of the Gringard reagent (PhMgCl) remains in solutions.

Specific structural information was obtained from $^{13}$C and $^{27}$Al NMR measurements, with the latter being the most useful. The $^{27}$Al NMR spectra of these solutions are usually characterized by broad peaks. However, when the symmetry of the molecules is tetrahedral, a narrowing of the peaks width is seen. Therefore, by examining the peak width, one can determine the symmetry of the Al atoms in the ions/molecules in solutions. A part from the coordination number and the symmetry of Al atoms in the ions/molecules, the chemical shifts might point to the nature of Al ligands, namely, as the number of the inorganic ligands (Cl) higher, the chemical shift should be lower (Hence, as the number of the organic ligands is higher, the chemical shift should be higher) (see O. Chusid, H. Gizbar, Y. Gofer, Y. Vestfried, H. E. Gottlieb, V. Marks and D. Aurbach, *Electrochem. & Solid State Letters ESSL* 9, A257, 2006).

In order to assign each $^{27}$Al peak to the corresponding species, a series of solutions of different compositions and concentrations was analyzed. The NMR spectra of $AlCl_3$ (the Lewis acid precursor of the APC solutions) in THF, show a single peak at a chemical shift of 63 ppm, for unsaturated solutions. With a saturated $AlCl_3$ solution, an additional peak is observed at 102 ppm corresponding to a $Al_2Cl_6$ dimer.

We assume that reacting PhMgCl and $AlCl_3$ at high base to acid ratio should form $AlPh_4^-$ as the main anionic species. The $^{27}$Al NMR spectrum of $(PhMgCl)_4$—$AlCl_3$ solutions, shows a single peak at 132 ppm. This peak should be attributed to $AlPh_4^-$, which is the expected product of trans metalation of the ligands between Mg and Al, at a high ratio between the Gringard reagent (PhMgCl) and the $AlCl_3$ Lewis acid. The following reactions scheme is suggested to such solutions:

$$AlCl_3+4PhMgCl \rightarrow AlPh_3+3MgCl_2+ \\ PhMgCl \rightarrow AlPh_4^-+MgCl^++3MgCl_2 \quad (1)$$

Reacting PhMgCl and $AlCl_3$ at high acid/base ratio, we expect the formation of species such as $PhAlCl_2$ and $PhAlCl_3^-$, according to the following scheme:

$$AlCl_3+PhMgCl \rightarrow PhAlCl_2+MgCl_2 \rightarrow PhAlC_3^-+MgCl^+ \quad (2)$$

The $^{27}$Al spectra of PhMgCl—$(AlCl_3)_2$ solutions (e.g. 0.2-0.4M), show the expected $AlCl_3$ peak at 63 ppm and a second broad peak at 91.5 ppm. It is most logical to attribute this peak with the medium shift (between that of $AlCl_3$ and $AlPh_4^-$) to $AlCl_2Ph$ and/or $AlCl_3Ph^-$.

In the next step, solutions with $PhMgCl:AlCl_3$ ratios equal to 4:3, 1:1, 3:2 and 2:1 (THF) were analyzed. FIG. 12 shows the $^{27}$Al NMR spectra of these solutions with a different $PhMgCl:AlCl_3$ ratios between the reagents. The peaks corresponding to the $Al_2Cl_6$ dimer (102 ppm) and to the $AlPh_4^-$ species (132 ppm) were observed plus peaks around 110-115 ppm that belong to aluminum. The latter is bound to both chloride and phenyl ligands, where the higher chemical shift is associated to the higher number of phenyl ligands in the Al species. The selection of the precursors ratios in the solutions measured enabled indeed differentiation among the various species formed in each solution. FIG. 20 presents the species assigned to the various $^{27}$Al peaks in the spectra of FIG. 12. In addition, $^{13}$C NMR spectra of these solutions were measured. They include peaks in the domains 125.5-126.5 ppm (ring carbons close to Al) and 136.8-138.2 ppm (ring carbons far from Al). They are much less conclusive, but generally in line with the $^{27}$Al spectra. Based on the spectra of the above four solutions (see FIG. 12), it was possible to analyze quite precisely the reactions and equilibria that take place in each solution. Consequently, scheme 1 provides the relevant reactions equations for each of the four solutions.

Scheme 1: Reactions paths and final composition of several PhMgCl—$AlCl_3$ solutions with different reagents ratios as indicated, based on their NMR spectra (FIG. 12).

(a) Solutions comprising PhMgCl and $AlCl_3$ in a ratio of 4:3
1. 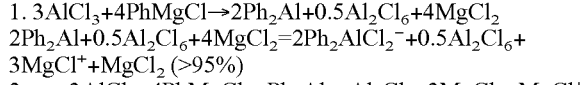
2. $3AlCl_3+4PhMgCl \rightarrow Ph_4Al^-+Al_2Cl_6+3MgCl_2+MgCl^+$ (<5%)

(b) Solutions comprising PhMgCl and $AlCl_3$ in a ratio of 1:1
1. 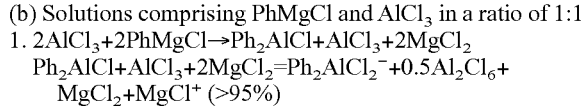
2. $2AlCl_3+2PhMgCl \rightarrow Ph_4Al^-+2MgCl_2+AlCl_3$ (<5%)

(c) Solutions comprising PhMgCl and $AlCl_3$ in a ratio of 3:2
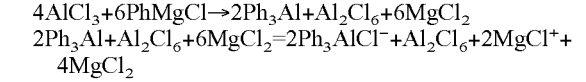

(d) Solution comprising PhMgCl and $AlCl_3$ in a ratio of 2:1 (that of the best performance)
1. 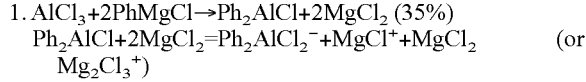
2. 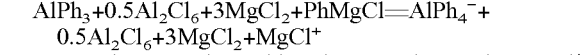

In equations 1 and 2 and in scheme 1, the species $MgCl^+$ and $MgCl_2$ appear as both products and intermediates. It should be noted, that based on the previous work (see D. Aurbach, Z. Lu, A. Schechter, Y. Gofer, C. Gizbar, R. Turgeman, Y. Cohen, M. Moshkovich and E. Levi. *Nature,* 407, 724, 2000, or D. Aurbach, H. Gizbar, A. Schechter, O. Chusid, H. E. Gottlieb, Y. Gofer, and I. Goldberg, *J. Electrochem. Soc.,* 149, A115, 2002, or H. Gizbar, Y. Viestfrid, O. Chusid, Y. Gofer, H. E. Gottlieb, V. Marks, and D. Aurbach, *Organometallics* 23, 3826-3831, 2004, or O. Chusid, H. Gizbar, Y. Gofer, Y. Vestfried, H. E. Gottlieb, V. Marks and D. Aurbach, *Electrochem. & Solid State Letters ESSL* 9, A257, 2006, or Y. Vestfried, O. Chusid, Y. Gofer and D. Aurbach, *Organometallics,* 26, 3130, 2007), it is clear that the cationic species in these solutions have complex structure. $MgCl^+$ and $MgCl_2$ form together the cation $Mg_2Cl_3^+$. All the above Mg—Cl moieties are stabilized by the ether molecules that also play an important role in the structure of both the cations and the anions in these solutions. Hence, the reactions paths and products distribution in equations 1 & 2 and scheme 1 above, provide a first approximation for the map of reactions possible in these solutions. The real picture may be more complicated, since more equilibrium reactions (beyond what is suggested above) may be relevant to each of the solutions discussed above. In any event, as can be seen from scheme 1, the solutions of the best performance, prepared with the precursors PhMgCl and $AlCl_3$ at a ratio of 2:1, comprise obviously $Ph_2AlCl_2^-$, $AlPh_4^-$ and $MgCl^+$ and/or $Mg_2Cl_3^+$ as main active species. The lack of species with Mg—C bonds, ensures a reasonable anodic stability for these systems, which is higher by 1 V compared to solutions based on complexes with alkyl ligands. Hence, one can conclude that organo-aluminate species, in which the ligands are aromatic, develop stronger Al—C bonds, compared to aliphatic systems. One can also conclude that the $AlCl_{4-n}R_n^-$ (n=0-4) anions thus formed are indeed more stable that the $AlCl_{4-n}R_n^-$ anions (R=alkyl), which are the active anionic species in the solutions that were explored and tested previously. Their relatively high stability ensures a very good ions separation in solutions, what explains well both the relatively high specific conductivity and the improved parameters of Mg deposition (relatively low over-potentials and cycling efficiency of 100%).

Figure 13:
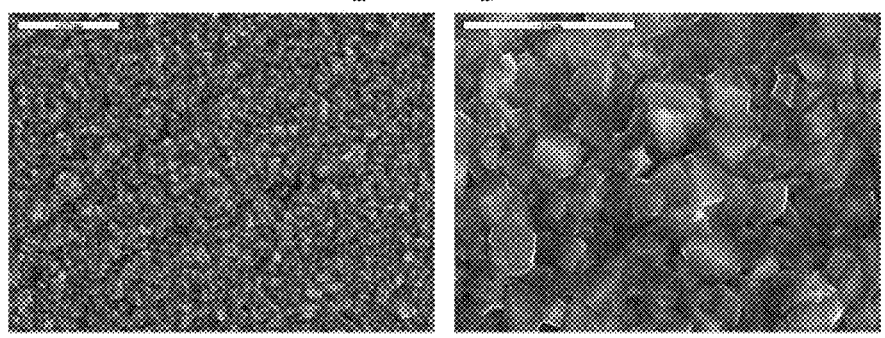
FIG. 13 is a graph displaying the SEM images of Mg deposits on copper substrates in BEC (0.25M) and APC (0.4) solutions as indicated. Two magnifications, a scale appears in each image.
Figure 13:
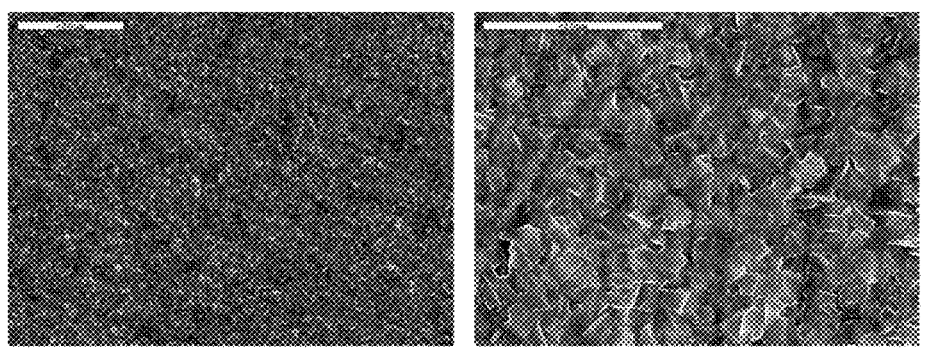

Reference is now made to FIG. 13, which is a graph displaying the SEM images of Mg deposits on copper substrates in BEC (0.25M) and APC (0.4) solutions as indicated. Two magnifications, a scale appears in each image.

FIG. 13 shows two pairs of SEM images at two magnifications (indicated) of magnesium deposits on Cu substrates from 0.25M $MgBu_2$-$(AlCl_2Et)_2$ (BEC) and 0.4M $(PhMgCl)_2$—$AlCl_3$ 9APC) solutions, the former solution showing the best performance in our previous studies and the latter one being the favorite electrolyte solution in the present invention. The deposition rates were at 1 mA/cm² with a total charge of a few coulmbs/cm². EDS measurements of the deposites confirmed that they are pure magnesium. These morphological measurements by SEM showed that Mg deposition from both solutions is very uniform. However, in general, the size of the Mg particles deposited from the APC solutions was found to be smaller (sub-micronic in average) compared to the Mg deposits from the BEC solutions (usually >2 µm, in average). This uniform Mg deposition morphology is very important for practical use, since it ensures the lack of dendrites formation in battery systems (provided that their engineering aspects are optimal).

Figure 14:
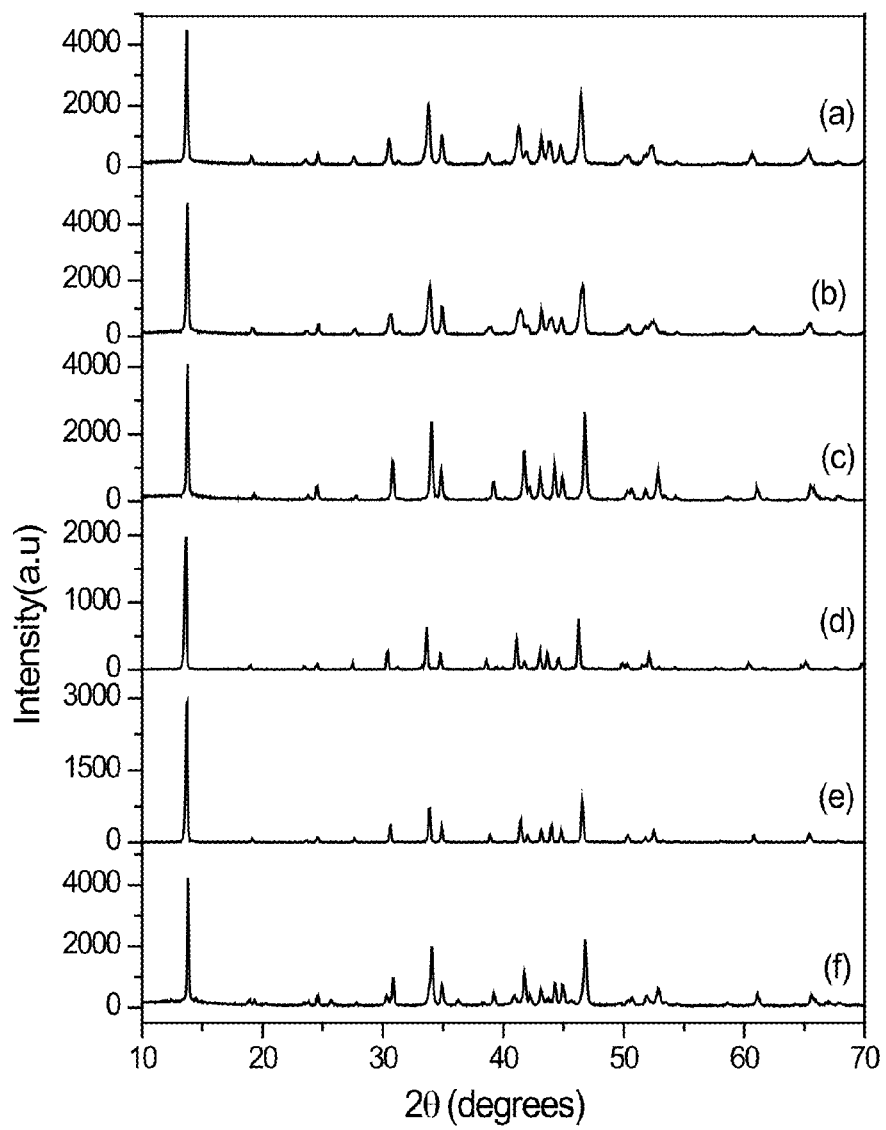
FIG. 14 is a graph displaying the X-ray powder diffraction patterns of $Mo_6S_8$, $Mo_6S_7Se_1$ and $Mo_6S_6Se_2$.

Reference is now made to FIG. 14 which is a graph displaying the X-ray powder diffraction patterns of $Mo_6S_8$, $Mo_6S_7Se_1$ and $Mo_6S_6Se_2$ obtained by the new synthesis at 900° C. (1a-c, respectively) and by the regular-high temperature method, up to 1250° C. (1d-f, respectively). FIG. 14 compares XRD patterns of micrometric-sized $Mo_6S_8$, $Mo_6S_7Se_1$ and $Mo_6S_6Se_2$ particles synthesized by the conventional method (quartz tubing, 1250° C.) with similar compounds prepared in stainless steel reactors at 900° C. (denotes as the new synthesis). This comparison demonstrates the broader peaks of the latter materials, which indicate their smaller particle size.

Figure 15A:
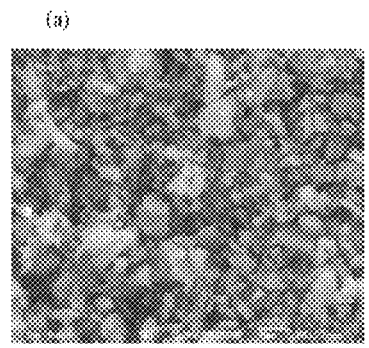
FIGS. 15A-F are Scanning electron micrographs of $Mo_6S_6Se_2$.
Figure 15B:
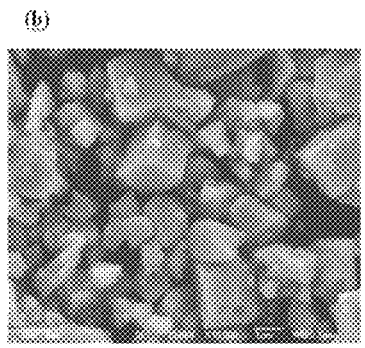
Figure 15C:
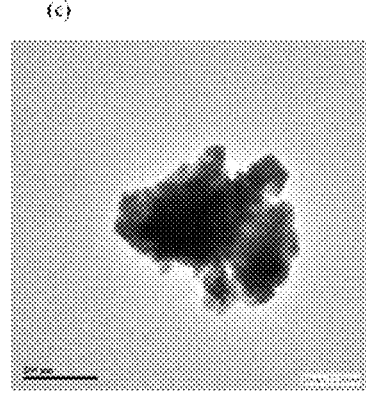
Figure 15D:
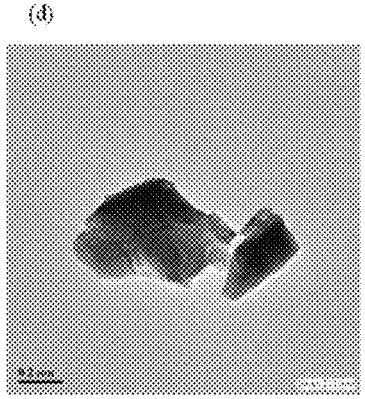
Figure 15:
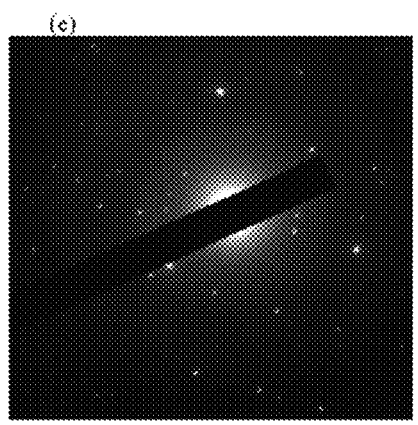
Figure 15F:
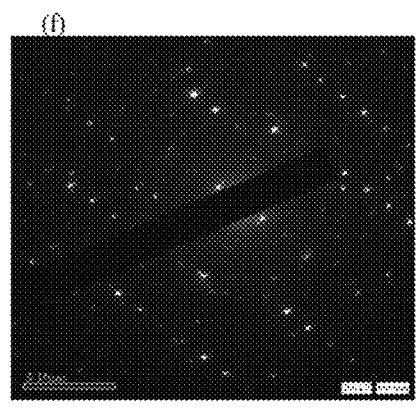
Figure 16:
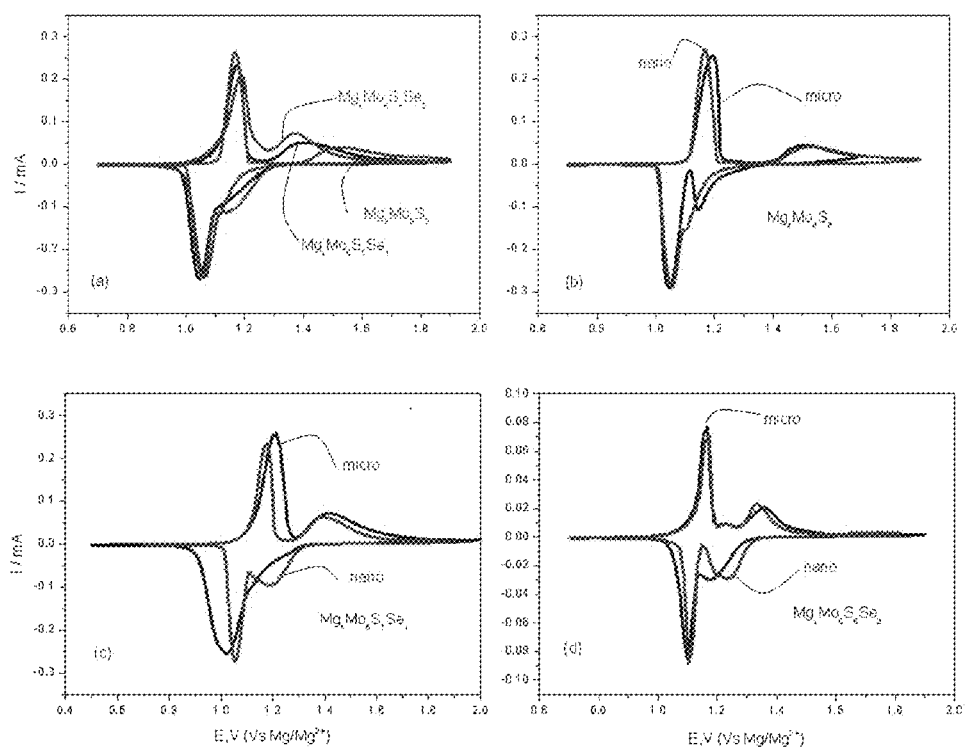
FIG. 16 is a graph displaying a comparison between a typical steady state cyclic voltammograms of electrodes comprising $Mg_xMo_6S_{8-n}Se_n$ (n=0, 1, 2) nano particles (new synthesis) and micro-Particles (regular, high temperature synthesis).

Reference is now made to FIG. 15 which is a graph displaying the Scanning electron micrographs of $Mo_6S_6Se_2$. The $Mo_6S_6Se_2$ particles were prepared by the new synthesis (15a) and by the high temperature synthesis (15b), showing that the new synthesis (according to the present invention) produces nano-particles. FIGS. 15C-F are high resolution transmission electron micrographs (HRTEM) of $Mo_6S_7Se$ synthesized by the new synthesis (15C) and by the regular high temperature synthesis (15D), and the relevant selected area electron diffraction patterns (SAED) of these materials (15E and 15F, respectively), which demonstrate (clear rings) that the samples are indeed crystalline (consistent with the XRD patterns of these materials). FIGS. 15A and 15B compare SEM micrographs of the $Mo_6S_6Se_2$ particles synthesized by the two methods, and FIGS. C-F provide a similar comparison for $Mo_6S_7Se$ by HRTEM micrographs together with electron diffraction patterns (SAED), which prove that the materials synthesized by both methods are fully crystalline. The morphological studies by electron microscopy (HRTEM, SEM) showed that the new synthesis produces according to the present invention Chevrel phases as nano-particles. It should be noted that there may be slight deviations between the designed stoichiometry of the $Mo_6S_{8-n}Se_1$ (based on the starting materials) and the stoichiometry reflected by the structural analysis by XRD. However, in any development of practical synthesis, it should be possible to adjust the exact final stoichiometry. In the present study, the exact final stoichiometry is not important, since the main goal was to examine the possibility of improving the behavior of Chevrel phases as a Mg battery cathode material by the partial substitution of S by Se. Reference is now made to FIG. 16, which is a graph displaying a comparison between a typical steady state cyclic voltammograms of electrodes comprising $Mg_xMo_6S_{8-n}Se_n$ (n=0, 1, 2) nano particles (new synthesis) and micro-particles (regular, high temperature synthesis). The scanning rate was 10V/s. The electrolyte solution was 0.25M $Mg(AlCl_2BuEt)_2$ in THF, 25° C. FIG. 16A is a comparison among the three types of nano-materials prepared by the new synthesis (as indicated), FIG. 16B is a comparison between nano and micro $Mg_xMo_6S_8$ electrodes, FIG. 16C is a comparison between nano and micro $Mg_xMo_6S_7S_1$ electrodes, and FIG. 16D is a comparison between nano and micro $Mg_xMo_6S_6Se_2$ electrodes. The results are spectacular and demonstrate the pronounced improvement in the electrochemical response of the systems by substituting part of the sulfur atoms in the Chevrel phases by selenium, and by the use of sub-micronic nanoparticles as the active mass in these systems. All the voltammograms in FIG. 16 show the typical, expected features of the electrochemical intercalation of magnesium into Chevrel phases. The Mg insertion occurs in two major steps (two main phase transitions, two sets of peaks). The first processes at the higher potential reflect a sluggish kinetics. The peaks are very broad and the peak separation is very large. In contrast, the second process is fast (a similar kinetics as that of Li insertion into the same material) and is characterized by a pair of sharp peaks. It is spectacular in FIG. 16 that the substitution of one or two sulfur atoms per $Mo_6S_8$ by one or two selenium atoms makes the first sluggish magnesiation process to be more reversible, a change that is clear in the order of $Mgo_{0-2}MoS_6Se_2$>$Mg_{0-2}Mo_6S_7Se$>$Mgo_{0-2}Mo_6S_8$. The comparison between the voltammograms of the electrodes comprising nano- and microparticles of similar compounds (in the FIGS. 16B-D) also show clearly that the nanomaterials are advantageous, as their voltammograms reflect much more reversible and faster processes than the electrodes comprising the microparticles. It should be noted that the voltammograms of the mixed (S—Se) materials may reflect a third (minor) Mg insertion process, in intermediate potentials between the potentials of the abovementioned two main processes. As was shown by McKinnon et al. for Li insertion into Chevrel phases, such additional processes relate to anion ordering, because the energy of the cation sites depends on the anion environment.

Figure 17:
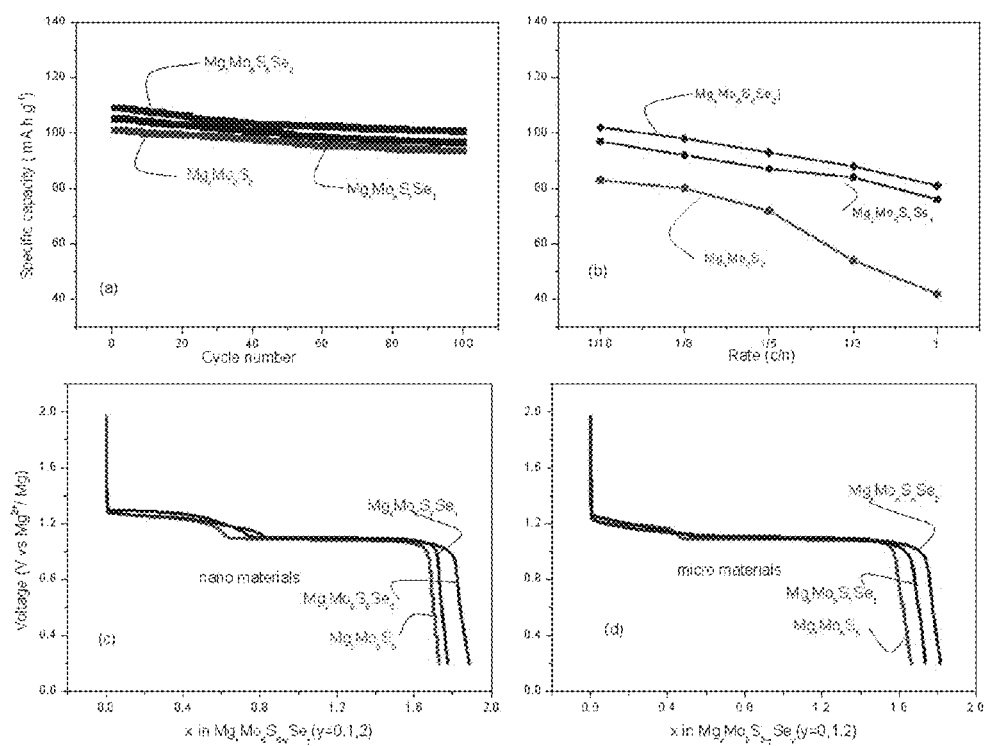
FIG. 17 is a graph displaying at typical capacity vs. cycle number, capacity vs. rate curves and voltage profiles of various $Mg_xMo_6S_{8-n}Se_n$, (y=0, 1 and 2) electrodes during galvanostatic discharge-charge cycling at various rates in 0.25M $Mg(AlCl_2BuEt)_2/THF$ solutions.

Reference is now made to FIG. 17, which is a graph displaying at typical capacity vs. cycle number, capacity vs. rate curves and voltage profiles of various $Mg_xMo_6S_{8-n}Se_n$, (y=0, 1 and 2) electrodes during galvanostatic discharge-charge cycling at various rates in 0.25M $Mg(AlCl_2BuEt)_2$/THF solutions. FIG. 17A is the capacity vs. cycle number curves of electrodes comprising the nano-materials, 25° C., C/8 rate. FIG. 17B is a comparison between capacity vs. rate for electrodes comprising nano $Mg_xMo_6S_{8-n}Se_n$ materials (indicated), 15° C. FIG. 17C is a typical voltage vs. capacity curves of electrodes comprising the nano-materials, 25° C., C/8 rate. FIG. 17D is the same as 17C, electrodes comprising micro-particles.

The voltage profiles of the two sets of materials (nano and micro $Mg_xMo_6S_{8-n}$, n=0, 1, 2) show that the $Mg_xMo_6S_6Se_2$ material has the highest reversible magnesiation capacity, while $Mg_xMo_6S_7Se$ shows an intermediate behavior between $Mg_xMo_6S_8$ and $Mg_xMo_6S_6Se_2$. The nanomaterials possess a higher capacity than the microparticles of $Mg_xMo_6S_{8-n}Se_n$. The FIG. 17C demonstrate the superior rate capabilities of electrodes comprising nano $Mg_xMo_6S_6Se_2$. At 13C rates, this material shows a capacity decrease of only 10%, compared to the optimal values measured at low rates. These results prove that although the substitution of 2 sulfur atoms in the Chevrel phase by heavier selenium atoms decreases the theoretical capacity by a few percent, the practical capacity of these materials is higher than that of all other Chevrel phases, because of two reasons:
  1. The presence of selenium in the anionic framework of this material increases its polarizability and thus increases the kinetics of the solid state diffusion of Mg ions in the host.
  2. The presence of Se should change the geometry of the inner and outer rings (of the Mg insertion sites). As a result, Mg hopping between these rings may be easier than that in the pure sulfide CP, what avoid charge trapping.

As also demonstrated in FIG. 17A, the cycle life of prototype Mg batteries, which comprise the new cathode material, measured in coin-type cells, is very good. It was found that the slight decrease in capacity upon cycling, observed with these systems, is due only to the slow evaporation of the solvent (THF) through the plastic gaskets of the coin-type cells. This was confirmed by cycling such cells in closed vessels, which atmosphere was saturated by THF. Hence, a new cathode material for rechargeable Mg battery material was developed within the framework of this work, i.e., nano-$Mg_xMo_6S_6Se_2$ produced by a very simple and cheap method that demonstrates improvements in both capacity and rate capability, compared to the first generation, all sulfur, microparticles, Chevrel phase cathodes.

There were also successful attempts to improve the electrolyte solutions for Mg batteries. It was demonstrated that the anodic stability of ethereal solutions containing $(R_2Mg)_n$ $(AlCl_{3-n}R'_n)_m$ complexes, which serve as electrolyte solutions for the rechargeable Mg battery systems, could be pronouncedly increased by the fabrication of complexes where all their organic ligands are phenyl groups. A relatively simple synthesis was developed using $AlCl_3$ and PhMgCl as precursors. These solutions were rigorously explored by multi nuclei NMR and Raman spectroscopies, in a similar way in which other complex solutions of this type were explored. It is clear that the reaction between PhMgCl and $AlCl_3$ involves trans metallation, in which the phenyl groups become bound to aluminum, and the Mg ions are bound only to Cl ions (and ether molecules). The absence of moieties with Mg—R(R=organic ligands) bonds is a mandatory condition for the high anodic stability of these solutions.

Figure 18:
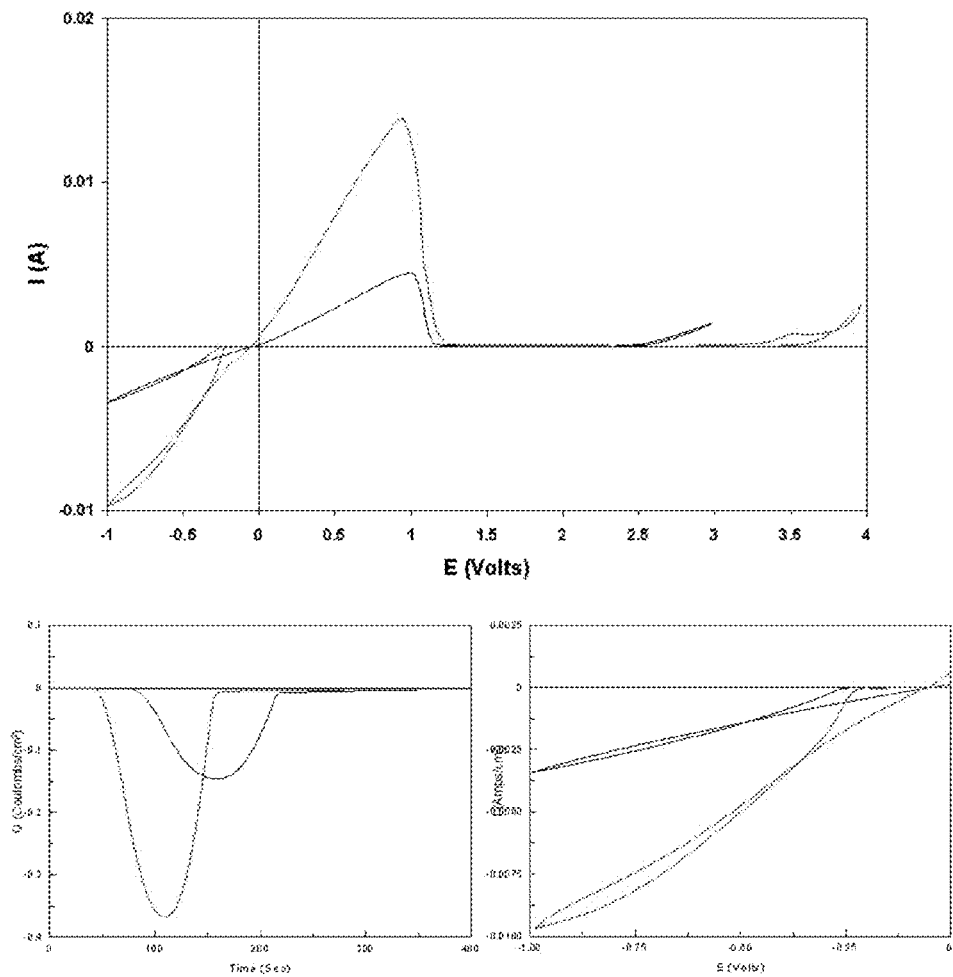
FIG. 18 is graph displaying a comparison between the voltammetric behavior of THF solutions containing 0.25 M of the reaction product between 1:2 MgBu$_2$ and AlCl$_2$Et (ethylbutyl complex, standard solutions) and 0.4 M of the reaction product between 1:2 AlCl$_3$ and PhMgCl.

Solutions comprising 0.4 M 1:2 $AlCl_3$-PhMgCl adduct demonstrate a 1 V higher anodic stability, as compared to the first generation solutions comprising 0.25 M of the 1:2 $MgBu_2$-$AlCl_2Et$ adduct, as demonstrated in FIG. 18. This figure shows steady state voltammograms of "all phenyl" and "butyl-ethyl" complex solutions with Pt electrodes. It also demonstrates that the kinetics of Mg deposition/dissolution in the new 'all phenyl' solutions is faster than that measured for the first generation solutions. 0.4 M was found to be an optimal concentration of the 'all phenyl' complex in THF solutions. The Mg cycling efficiency in these solutions is 100% (as demonstrated in the left insert of this figure), and the over potential measured for Mg deposition on Pt is less than 200 mV, lower by 100 mV as compared to the first generation 'butyl-ethyl' complex solutions, as demonstrated in the right insert in FIG. 18).

The ionic conductivity of the 'all phenyl' solutions is pronouncedly higher than that of $MgBu_2(AlCl_2Et)_2$ solutions at optimal concentrations (0.4 and 0.25 M, respectively). For the former solutions it varies from 2 to 9 $mScm^{-1}$ between −10 to 80° C. and for the latter, standard solutions it varies at the same temperature range between 1 to 2.5 $mScm^{-1}$ (4 vs. 2 $mScm^{-1}$ at RT). Hence, the solutions comprising the 'all phenyl' complexes are advantageous over the first generation solutions that contained 'all alkyl' complexes, from all points of view: wider electrochemical window, higher conductivity, and faster kinetics of Mg deposition/dissolution processes. Overcharge experiments with these solutions, up to 10 V, showed no gas evolution or thermal runaway. Their electrolysis produces only liquid products, benzene and biphenyl. The high anodic stability of these new solutions opens the door for the use of high voltage cathodes for Mg batteries, and hence, calls for further innovative work in this field.

EXAMPLES

Various examples were carried out to prove the embodiments claimed in the present invention. Some of these experiments are referred hereinafter. The examples describe the manner and process of the present invention and set forth the best mode contemplated by the inventors for carrying out the invention, but are not to be construed as limiting the invention.

Example 1

An intercalation cathode comprising a Chevrel phase compound represented by the formula $Mo_6S_{8-y}Se_y$, in which y is higher than 1 and lower than 2, according to the present invention was prepared as follows: first $Cu_{2.5}Mo_6S_{8-y}Se_y$ (y=1, 2) nano materials was synthesized. The syntheses of $Cu_{2.5}Mo_6S_{8-y}Se_y$ (y=1, 2) nano materials were carried out in stainless steel (SS) cells made of Swagelok parts: a ¾" union part was plugged from both sides by standard caps. The starting materials: $MoS_2$, $MoSe_2$, molybdenum and copper powder or elemental Mo, Cu, S, Se, were introduced into the SS cell under argon atmosphere, and the cell was heated in a furnace. The temperature was raised to 900° C. at a heating rate of 2° C. per minute and was maintained at this high level temperature for 16 hours. The cell was gradually cooled to room temperature. $Mo_6S_{8-y}Se_y$ (y=1, 2) Chevrel phases were obtained from $Cu_{2.5}Mo_6S_{8-y}Se_y$ precursors, from which copper was leached in an aqueous HCl solution under bubbling air for 7 hours. After leaching, the powder was filtered with a fine glass frit, washed with the same solvent, and dried in an oven at 120° C.

Example 2

An intercalation cathode comprising a Chevrel phase compound represented by the formula $Mo_6S_{8-y}Se_y$, in which y=0, according to the present invention was prepared as follows: first $Cu_{2.5}Mo_6S_{8-y}Se_y$ (y=0) nano materials was synthesis. The syntheses of $Cu_{2.5}Mo_6S_{8-y}Se_y$ (y=0) nano materials were carried out in stainless steel (SS) cells made of Swagelok parts: a ¾" union part was plugged from both sides by standard caps. The starting materials: $MoS_2$, molybdenum and copper powder or elemental Mo, Cu, S, were introduced into the SS cell under argon atmosphere, and the cell was heated in a furnace. The temperature was raised to 900° C. at a heating rate of 2° C. per minute and was maintained at this high level temperature for 16 hours. The cell was gradually cooled to room temperature. $Mo_6S_{8-y}Se_y$ (y=0) Chevrel phases were obtained from $Cu_{2.5}Mo_6S_{8-y}Se_y$ (y=0) precursors, from which copper was leached in an aqueous HCl solution under bubbling air for 7 hours. After leaching, the powder was filtered with a fine glass frit, washed with the same solvent, and dried in an oven at 120° C.

Example 3

An intercalation cathode comprising a Chevrel phase compound represented by the formula $M_xMo_6S_8$, in which M is copper (Cu); x is higher than 0 and lower than 2, according to the present invention was prepared as follows: reacting the powdered elements mixture in an evacuated, sealed quartz tube. The reaction is: $2Cu+6Mo+8S \rightarrow Cu_2Mo_6S_8$. The procedure consisted of four sequential stages:
(1) heating to 450° C. for 24 h; (2) heating to 700° C. for 24 h; (3) heating at 1050° C. for 48 h; (4) cooling down to room temperature at the rate of 120° C./h.

Example 4

An intercalation cathode comprising a Chevrel phase compound represented by the formula $M_xMo_6S_8$, in which M is selected copper (Cu); x is higher than 0 and lower than 2, according to the present invention was prepared as follows: milling and squeezing $MoS_2$, CuS and Mo powders mixture. Then the mixture was inserted into a swagelok cell in argon atmosphere (e.g. in glovebox). The reaction is: $2CuS+3MoS_2+3Mo \rightarrow Cu_2Mo_6S_8$. The procedure consisted of three sequential stages (1) Heating to 900° C. at rate 90° C./h; (2) Heating at 900° C. for 17 h; and (3) Cooling down to the room temperature, by shutting down the furnace.

Example 5

An intercalation cathode comprising a Chevrel phase compound represented by the formula $M_xMo_6S_8$, in which M is copper (Cu); x is higher than 0 and lower than 2, according to the present invention was prepared as follows: milling and squeezing $MoS_2$, CuS and Mo powders mixture. Potassium salts such as KCl and $KCO_3$ were used as solvents after their drying during 3 h at 150° C. under vacuum.
The reactants mixture (solvent/reactants=2, by weight) was hand-ground in a mortar and pestle for few minutes, and then was poured into a corundum crucible. The latter was purged with a very slow flow of argon, for 1 h before and during the heating in order to maintain inert atmosphere. The system was heated to 850° C. at a rate of 150° C./h, held for 60 h, and then cooled to room temperature by shutting down the furnace. The products were washed twice with hot deionized water, and sonicated for 20 min to dissolve any remaining salt and to deagglomerate the particles. Thus, the molten salt method is extremely attractive for the large-scale production.

Example 6

An intercalation cathode comprising a chevrel phase compound represented by the formula $M_xMo_6S_8$ in which M is silver (Ag); x is higher than 0 and lower than 2, according to the present invention was prepared as follows: milling and squeezing $MoS_2$, $Ag_2S$, S and Mo powders mixture. Then the mixture was inserted into a swagelok cell in argon atmosphere (e.g. in glovebox). The reaction is: $Ag_2S+7MoS_2+S+5Mo \rightarrow 2AgMo_6S_8$. The procedure consisted of three sequential stages (1) Heating to 800° C. at rate 90° C./h; (2) Heating at 800° C. for 17 h; and (3) Cooling down to the room temperature, by shutting down the furnace.

Example 7

An intercalation cathode comprising a Chevrel phase compound represented by the formula $M_xMo_6S_8$ in which M is silver (Ag); x is higher than 0 and lower than 2, according to the present invention was prepared as follows: milling and squeezing $MoS_2$, $Ag_2S$, S and Mo powders mixture. Potassium salts such as KCl and $KCO_3$ were used as solvents after their drying during 3 h at 150° C. under vacuum.
The reactants mixture (solvent/reactants=2, by weight) was hand-ground in a mortar and pestle for few minutes, and then was poured into a corundum crucible. The latter was purged with a very slow flow of argon, for 1 h before and during the heating in order to maintain inert atmosphere. The system was heated to 850° C. at a rate of 150° C./h, held for 60 h, and then cooled to room temperature by shutting down the furnace. The products were washed twice with hot deionized water, and sonicated for 20 min to dissolve any remaining salt and to deagglomerate the particles. Thus, the molten salt method is extremely attractive for the large-scale production.

Example 8

An intercalation cathode comprising a Chevrel phase compound represented by the formula $M_xMo_6S_8$ in which M is silver (Ag); x is higher than 0 and lower than 2, according to the present invention was prepared as follows: reacting the powdered elements mixture in an evacuated, sealed quartz tube. The reaction is: $Ag+6Mo+8S \rightarrow AgMO_6S_8$. The procedure consisted of four sequential stages:
(1) heating at 450° C. for 24 h; (2) heating at 700° C. for 24 h; (3) heating at 1050° C. for 48 h; (4) cooling down to room temperature at the rate of 120° C./h.

Example 9

An intercalation cathode comprising a Chevrel phase compound represented by the formula $M_xMo_6S_8$, in which M is nickel (Ni); x is higher than 0 and lower than 2, according to the present invention was prepared as follows: milling and squeezing $MoS_2$, NiS and Mo powders mixture. Then the mixture was inserted into a swagelok cell in argon atmosphere (e.g. in glovebox). The reaction is: $2NiS+3MoS_2+3Mo \rightarrow Ni_2Mo_6S_8$. The procedure consisted of three sequential stages (1) Heating to 900° C. at rate 90° C./h; (2) Heating at 900° C. for 17 h; and (3) Cooling down to the room temperature, by shutting down the furnace.

Example 10

An intercalation cathode comprising a Chevrel phase compound represented by the formula $M_xMo_6S_8$ in which M is nickel (Ni); x is higher than 0 and lower than 2, according to the present invention was prepared as follows: milling and squeezing $MoS_2$, NiS and Mo powders mixture. Potassium salts such as KCl and $KCO_3$ were used as solvents after their drying during 3 h at 150° C. under vacuum.

The reactants mixture (solvent/reactants=2, by weight) was hand-ground in a mortar and pestle for few minutes, and then was poured into a corundum crucible. The latter was purged with a very slow flow of argon, for 1 h before and during the heating in order to maintain inert atmosphere. The system was heated to 850° C. at a rate of 150° C./h, held for 60 h, and then cooled to room temperature by shutting down the furnace. The products were washed twice with hot deionized water, and sonicated for 20 min to dissolve any remaining salt and to deagglomerate the particles. Thus, the molten salt method is extremely attractive for the large-scale production.

Example 11

An intercalation cathode comprising a Chevrel phase compound represented by the formula $M_xMo_6S_8$ in which M is nickel (Ni); x is higher than 0 and lower than 2, according to the present invention was prepared as follows: reacting the powdered elements mixture in an evacuated, sealed quartz tube. The reaction is: $2NiS+3MoS_2+3Mo \rightarrow Ni_2Mo_6S_8$. The procedure consisted of four sequential stages: (1) heating at 450° C. for 24 h; (2) heating at 700° C. for 24 h; (3) heating at 1050° C. for 48 h; (4) cooling down to room temperature at the rate of 120° C./h.

Example 12

An electrochemical cell was prepared consisting of Chevrel cathode materials: $Mo_6S_8$, $Mo_6S_7Se$ or $Mo_6S_6Se_2$ as nano-powders and prepare cathodes comprising nickel current collectors (mesh or foil), 80-90% $Mo_6S_{8-Y}Se_Y$ active mass, 5-10% carbon power and 5-10% polyvinylidene di-fluoride binder (PVdF). These cathodes work very well as the positive electrodes in rechargeable Mg batteries. The anodes are Mg and or Mg alloy (1-5% Al, 1-5% Zn) foils the electrolyte is gel, which contains the polymers polyethylene-oxide or polyvinylidene di-fluoride (PVdF) (70-90%) tetra-glyme, tri-glyme, glyme and/or tetra-hydrofuran (THF) as plasticizer (3-10%) and the electrolyte $(MgR_2)_x$-$(AlCl_{3-n}R_n)_y$ (R=methyl, ethyl, butyl, phenyl and their derivatives); n=0, 1, 2, 3; x=1, 2, 3%; y=1, 2, 3, 4, 5 (5-10% electrolyte). The batteries may contain polypropylene or glass fibers separator between the electrodes. The test vehicles are coin type cells (2032 standard parts from NRC inc. Canada) or AA cells in glass tubing. These batteries can be maid as standard commercial AA, AAA, C, D, DD cells.

Example 13

An electrochemical cell was prepared consisting of Chevrel cathode materials: $M_xMo_6S_8$, in which M is Cu, Ni, Ag and any other transition metal; 0<x<2, and prepare cathodes comprising nickel current collectors (mesh or foil), 80-90% $M_xMo_6S_8$ active mass, 5-10% carbon power and 5-10% polyvinylidene di-fluoride binder (PVdF). These cathodes work very well as the positive electrodes in rechargeable Mg batteries. The anodes are Mg and or Mg alloy (1-5% Al, 1-5% Zn) foils the electrolyte is gel, which contains the polymers polyethylene-oxide or polyvinylidene di-fluoride (PVdF) (70-90%) tetra-glyme, tri-glyme, glyme and/or tetra-hydrofuran (THF) as plasticizer (3-10%) and the electrolyte $(MgR_2)_x$—$(AlCl_{3-n}R_n)_y$ (R=methyl, ethyl, butyl, phenyl and their derivatives); n=0, 1, 2, 3; x=1, 2, 3; y=1, 2, 3, 4, 5 (5-10% electrolyte). The batteries may contain polypropylene or glass fibers separator between the electrodes. The test vehicles are coin type cells (2032 standard parts from NRC inc. Canada) or AA cells in glass tubing. These batteries can be maid as standard commercial AA, AAA, C, D, DD cells.

Example 14

An electrolyte solution which comprise tetra-glyme, tri-glyme, glyme and/or tetra-hydrofuran (THF) and their mixtures as solvents and the electrolytes $(MgR_2)_x$—$(AlCl_{3-n}R_n)_y$, in which R is selected from a group comprising methyl, ethyl, butyl, phenyl and their derivatives; n is 0, 1, 2, 3; x is 1, 2, 3; y is 1, 2, 3, 4, 5; 0.2-0.5M, according to the present invention was prepared as follows: reacting $AlCl_{3-n}R_n$ in which R is selected from a group comprising methyl, ethyl, butyl, phenyl and their derivatives; n is 0, 1, 2, 3 (Lewis acid component) and $MgR_2$ in which R is selected from a group comprising methyl, ethyl, butyl, phenyl and their derivatives (Lewis base component) at any desirable ratios. Alternatively, we can use RMgCl in which R is selected from a group comprising methyl, ethyl, butyl, phenyl and their derivatives as the Lewis base component and $AlCl_3$ or $AlCl_2R$ in which R is selected from a group comprising methyl, ethyl, butyl, phenyl and their derivatives as the Lewis acid components at desirable ratios. These materials may be commercially available as solutions in THF or in alkanes (e.g. hexane, heptane). They can react by mixing their solutions (as obtained commercially). The solvents are evaporated and the solid product is dissolved in the desirable ether solvent (e.g. tetraglyme, THF) or ether mixture, thus forming solutions of 0.2-0.6 M. The final stage is the addition of tetraalkylammonium chloride, $R_4NCl$ (R=methyl, ethyl, butyl, phenyl and their derivatives) to the $(MgR_2)_x$—$(AlCl_{3-n}R_n)_y$ R=methyl, ethyl, butyl, phenyl and their derivatives; n=0, 1, 2, 3; x=1, 2, 3; y=1, 2, 3, 4, 5; 0.2-0.5 M solution in the ether solvent(s) up to concentration of 0.5 M. The result is improved solutions for rechargeable Mg batteries.

Example 15

An electrolyte solution which comprise tetra-glyme, tri-glyme, glyme and/or tetra-hydrofuran (THF) and their mixtures as solvents and the electrolytes $(MgR_2)_x$-$(AlCl_{3-n}R_n)_y$ in which R is selected from a group comprising methyl, ethyl, butyl, phenyl and their derivatives; n=0, 1, 2, 3; x=1, 2, 3; y=1, 2, 3, 4, 5; 0.2-0.5 M. The electrolytes are prepared by reacting $AlCl_{3-n}R_n$ in which R is selected from a group comprising methyl, ethyl, butyl, phenyl and their derivatives; n=0, 1, 2, 3 (Lewis acid component) and $MgR_2$ in which R is selected from a group comprising methyl, ethyl, butyl, phenyl and their derivatives (Lewis base component) at any desirable ratios. Alternatively, we can use RMgCl in which R is selected from a group comprising methyl, ethyl, butyl, phenyl and their derivatives as the Lewis base component and $AlCl_3$ or $AlCl_2R$, in which R is selected from a group comprising methyl, ethyl, butyl, phenyl and their derivatives as the Lewis acid components at desirable ratios. These materials may be commercially available as solutions in THF or in alkanes (e.g. hexane, heptane). They can react by mixing their solutions (as obtained commercially). The solvents are evaporated and the solid product is dissolved in the desirable ether solvent (e.g. tetraglyme, THF) or ether mixture, thus forming solutions of 0.2-0.6 M. The final stage is addition of LiX in which X is selected from a group comprising Cl and Br to the $(MgR_2)_x$—$(AlCl_{3-n}R_n)_y$, in which R is selected from a group comprising methyl, ethyl, butyl, phenyl and their derivatives; n=0, 1, 2, 3; x=1, 2, 3 y=1, 2, 3, 4, 5; 0.2-0.5 M solution in the ether solvent(s) up to concentration of 0.5 M for LiCl and 2 M for LiBr. The result is improved solutions for rechargeable Mg batteries.

Example 16

An electrolyte solution which comprise tetra-glyme, tri-glyme, glyme and/or tetra-hydrofuran (THF) and their mixtures as solvents and the electrolytes $(MgR_2)_x$-$(AlCl_{3-n}R_n)_y$, in which R is selected from a group comprising methyl, ethyl, butyl, phenyl and their derivatives; n=0, 1, 2, 3; x=1, 2, 3; y=1, 2, 3, 4, 5; 0.2-0.5 M as described in 7, 8 above. Upon addition of $R_4NCl$, in which R is selected from a group comprising methyl, ethyl, butyl, phenyl and their derivatives or LiCl up to 0.5 M or LiBr up to 2 M, solutions of high conductivity are obtained (up to 10 mS/cm, a conductivity which is not lower than that of solutions to Li and Li ion batteries).

The invention claimed is:

1. An electrolyte for use in an electrochemical cell, said electrolyte comprising:
    (a) at least one magnesium-aluminum complex represented by the formulae $(MgR_2)$—$(AlCl_{3-n}R_n)_y$, in which R is selected from the group consisting of methyl, ethyl, butyl and phenyl, y is greater than 1 and lower than 5, and n is equal or greater than 0 and lower than 3; and
    (b) at least one inert salt selected from the group consisting of tetrabutylammonium-chloride and LiX in which X is selected from the group consisting of chlorine (Cl) and bromine (Br), forming a magnesium-aluminum complex salt;
    wherein said complex salt is dissolved in a solvent selected from the group consisting of polyethers, glymes and tetra-hydrofuran (THF), forming a magnesium-aluminum complex solution;
    wherein the magnesium of said magnesium-aluminum complex is characterized by 100% reversible deposition-dissolution from said complex solution such that said deposition-dissolution of said magnesium has an electrochemical window of at least 3V.

2. A magnesium rechargeable battery comprising:
    (a) at least one intercalation cathode comprising a Chevrel phase compound;
    (b) at least one magnesium anode; and
    (c) at least one non-aqueous electrolyte solution comprising the magnesium-aluminum complex solution of claim 1.

3. The magnesium rechargeable battery according to claim 2, wherein said Chevrel phase compound is represented by the formula $M_xMo_6S_8$ in which M is selected from the group consisting of copper, nickel, and silver and x is greater than about 0 and lower than about 2.

4. The magnesium rechargeable battery according to claim 2, wherein said solution further comprises polyethylene-oxide or polyvinylidene di-fluoride (PVdF) from about 70% to 90% wt, and at least one of tetra-glyme, tri-glyme, glyme and tetra-hydrofuran (THF).

5. The magnesium rechargeable battery according to claim 2, further comprising a polypropylene or glass fibers separator located between the electrodes.

6. The magnesium rechargeable battery according to claim 2, wherein the concentration of said $(MgR_2)$—$(AlCl_{3-n}R_n)_y$ is greater than about 0.45M and lower than about 0.55M and wherein the concentration of said LiX is greater than about 0.2M and lower than about 0.3M.

7. A method for producing a magnesium rechargeable battery according to claim 2, said method comprising steps of:
    a. providing (i) at least one intercalation cathode comprising a Chevrel phase compound; (ii) at least one magnesium anode; and (iii) at least one nonaqueous electrolyte solution comprising the magnesium-aluminum complex solution; and,
    b. providing at least one of electrical and electrochemical communication between said cathode, said anode and said electrolyte;
    wherein said Chevrel phase compound represented by the formulae $Mo_6S_{8-Y}Se_Y$ in which y is greater than 0 and lower than about 2.

8. A method for producing a magnesium rechargeable battery according to claim 3, said method comprising the steps of:
    a. providing (i) at least one intercalation cathode comprising a Chevrel phase compound; (ii) at least one magnesium anode; and (iii) at least one non-aqueous electrolyte solution comprising the magnesium-aluminum complex solution; and
    b. providing electrical and electrochemical communication between said cathode, said anode and said electrolyte;
    wherein said Chevrel phase compound represented by the formulae $M_xMo_6S_8$ in which M is selected from the group comprising of copper (Cu), Nickel (Ni) silver (Ag) and x is greater than about 0 and lower than about 2.

9. A magnesium rechargeable battery comprising an electrochemical cell, the electrochemical cell comprising the electrolyte according to claim 1, further comprising at least one intercalation cathode comprising a Chevrel phase compound.

10. The magnesium rechargeable battery according to claim 9, wherein said Chevrel phase compound is represented by the formula $Mo_6S_{8-Y}Se_Y$ in which Y is greater than 0 and lower than 2.

11. The magnesium rechargeable battery according to claim 9, wherein said Chevrel phase compound is represented by the formula $M_xMo_6S_8$, in which M is selected from the group consisting of copper, nickel and silver and x is greater than 0 and lower than 2.

12. The magnesium rechargeable battery according to claim 10, further comprising a polypropylene or glass fibers separator located between said cathode and an anode.

13. The magnesium rechargeable battery according to claim 9, wherein said Chevrel phase compound is represented by the formulae $M_xMo_6S_8$ in which M is selected from the group consisting of copper (Cu), nickel (Ni) and silver (Ag) and x is greater than 0 and lower than 2.

14. An electrolyte for use in an electrochemical cell, said electrolyte comprising:
    (a) at least one magnesium-aluminum complex represented by the formula $(RMgCl)_x$—$(AlCl_{3-n}R_n)_y$, in which R is selected from the group consisting of methyl, ethyl, butyl and phenyl, y is greater than 1 and lower than 5, n is equal or greater than 0 and lower than 3, and x is greater than 1 and lower than 3; and
    (b) at least one inert salt selected from the group consisting of tetrabutylammonium-chloride and LiX, in which X is selected from the group consisting of chlorine (Cl) and bromine (Br), forming a magnesium-aluminum complex salt;
    wherein said electrolyte complex salt is dissolved in a solvent selected from the group consisting of polyethers, glymes and tetra-hydrofuran (THF), forming a magnesium-aluminum complex solution;
    wherein the magnesium of said magnesium-aluminum complex is characterized by 100% reversible deposition-dissolution from said complex solution such that said deposition-dissolution of said magnesium has an electrochemical window of at least 3V.

15. The magnesium rechargeable battery of claim 2, wherein said Chevrel phase compound is represented by the formulae $Mo_6S_{8-Y}Se_Y$, in which Y is greater than 0 and lower than about 2.

* * * * *